(12) United States Patent
Young et al.

(10) Patent No.: US 8,608,576 B2
(45) Date of Patent: *Dec. 17, 2013

(54) LENS ACCESSORY FOR VIDEO GAME SENSOR DEVICE

(75) Inventors: Allen Richard Young, Los Angeles, CA (US); Herschel Naghi, Beverly Hills, CA (US)

(73) Assignee: Nyko Technologies, Inc., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/403,828

(22) Filed: Feb. 23, 2012

(65) Prior Publication Data

US 2012/0306746 A1    Dec. 6, 2012

Related U.S. Application Data

(63) Continuation of application No. 13/153,341, filed on Jun. 3, 2011, now Pat. No. 8,123,622.

(51) Int. Cl.
*A63F 13/02*    (2006.01)
*A63F 13/04*    (2006.01)

(52) U.S. Cl.
USPC ......... 463/47; 463/7; 463/36; 463/37; 463/53

(58) Field of Classification Search
USPC ..................... 463/7, 36–37, 47, 53
See application file for complete search history.

(56) References Cited

U.S. PATENT DOCUMENTS

| | | |
|---|---|---|
| 2,978,955 A | 4/1961 | Frommer |
| 3,277,303 A | 10/1966 | Jensen et al. |
| 4,418,990 A | 12/1983 | Gerber |
| 5,414,256 A | 5/1995 | Gurner et al. |
| 5,946,532 A | 8/1999 | Ichinokawa |
| D433,074 S | 10/2000 | Clemmer |
| 6,337,736 B1 | 1/2002 | Sugiyama et al. |
| 6,583,433 B2 | 6/2003 | Sugiyama et al. |
| 6,653,046 B2 | 11/2003 | Kozaki et al. |
| 6,844,562 B2 | 1/2005 | Takaoka et al. |

(Continued)

FOREIGN PATENT DOCUMENTS

| | | |
|---|---|---|
| EP | 2 325 599 A1 | 5/2011 |
| WO | WO 2010/022667 A1 | 3/2010 |

OTHER PUBLICATIONS

"Here's what makes the XBOX Kinect tick", Retrieved on Jan. 21, 2011 from: http://gizmoplanet.co.uk/2010/11/here%E2%80%99s-what-makes-the-xbox-kinect-tick-pics/Copyright    2010-2011 (2 pgs.).

(Continued)

*Primary Examiner* — Werner Garner

(74) *Attorney, Agent, or Firm* — Christie, Parker & Hale, LLP

(57) ABSTRACT

A lens accessory for a video game sensor device and a method of adjusting a sensing distance of a video game sensor device. A lens accessory for a video game sensor device includes a first lens configured to cover an infrared light emitter of the video game sensor device, a second lens configured to cover an infrared light receiver of the video game sensor device, and a body portion coupling the first lens and the second lens together, the body portion being removably attachable to the video game sensor device, and the first lens and the second lens having a magnification for adjusting a sensing distance of the video game sensor device.

20 Claims, 27 Drawing Sheets

(56) References Cited

U.S. PATENT DOCUMENTS

| | | |
|---|---|---|
| 6,972,787 B1 | 12/2005 | Allen et al. |
| 7,119,912 B2 | 10/2006 | Takaoka |
| 7,265,439 B1 | 9/2007 | Wu et al. |
| 7,382,356 B2 | 6/2008 | Parker et al. |
| D632,340 S | 2/2011 | Guinchard et al. |
| 7,889,324 B2 | 2/2011 | Yamamoto |
| 8,111,382 B2 | 2/2012 | Wolf et al. |
| 8,123,622 B1 | 2/2012 | Young et al. |
| D665,461 S | 8/2012 | Ikeda et al. |
| 8,270,827 B2 | 9/2012 | Tse, Jr. |
| 8,303,421 B1 * | 11/2012 | Farley et al. ............ 463/53 |
| 8,314,923 B2 | 11/2012 | York et al. |
| 2003/0002033 A1 | 1/2003 | Boman |
| 2004/0120035 A1 | 6/2004 | Hoffmann |
| 2007/0066394 A1 | 3/2007 | Ikeda et al. |
| 2008/0152348 A1 | 6/2008 | Chen |
| 2009/0039161 A1 | 2/2009 | Matsushima |
| 2010/0016085 A1 | 1/2010 | Inoue |
| 2010/0110413 A1 | 5/2010 | Liu |
| 2010/0118123 A1 | 5/2010 | Freedman et al. |
| 2010/0208359 A1 | 8/2010 | Chen et al. |
| 2010/0284082 A1 | 11/2010 | Shpunt et al. |
| 2011/0169979 A1 | 7/2011 | Hong |

OTHER PUBLICATIONS

"Microsoft Kinect Teardown", Nov. 4, 2010, ifixit.com, available at <http://www.ifixit.com/Teardown/Microsoft-Kinect-Teardown/4066/1>.

"About MagniEye" (screenshots), copyright 2010, Newbie Gaming, downloaded on Oct. 18, 2011 at <http://www.orang3.netlnewbiegaming/product-magnieye.htmI>.

"Scoop: Small room? Try MagniEye for Microsoft Kinect!", May 18, 2011, 123KINECT.com, available at <http://123kinect.com/scoop-small-room-try-magnieye-for-microsoft-kinectl16249/>.

"E3 2011: MagniEye and Nyko's Zoom battle it out in your small room", Jun. 8, 2011, 123KINECT.com, available at <http://123kinect.com/2011-magnieye-nykos-zoom-battle-small-room/18491 I>.

Notice of Allowance for related Design U.S. Appl. No. 29/394,811, dated Dec. 3, 2012 (6 sheets).

\* cited by examiner

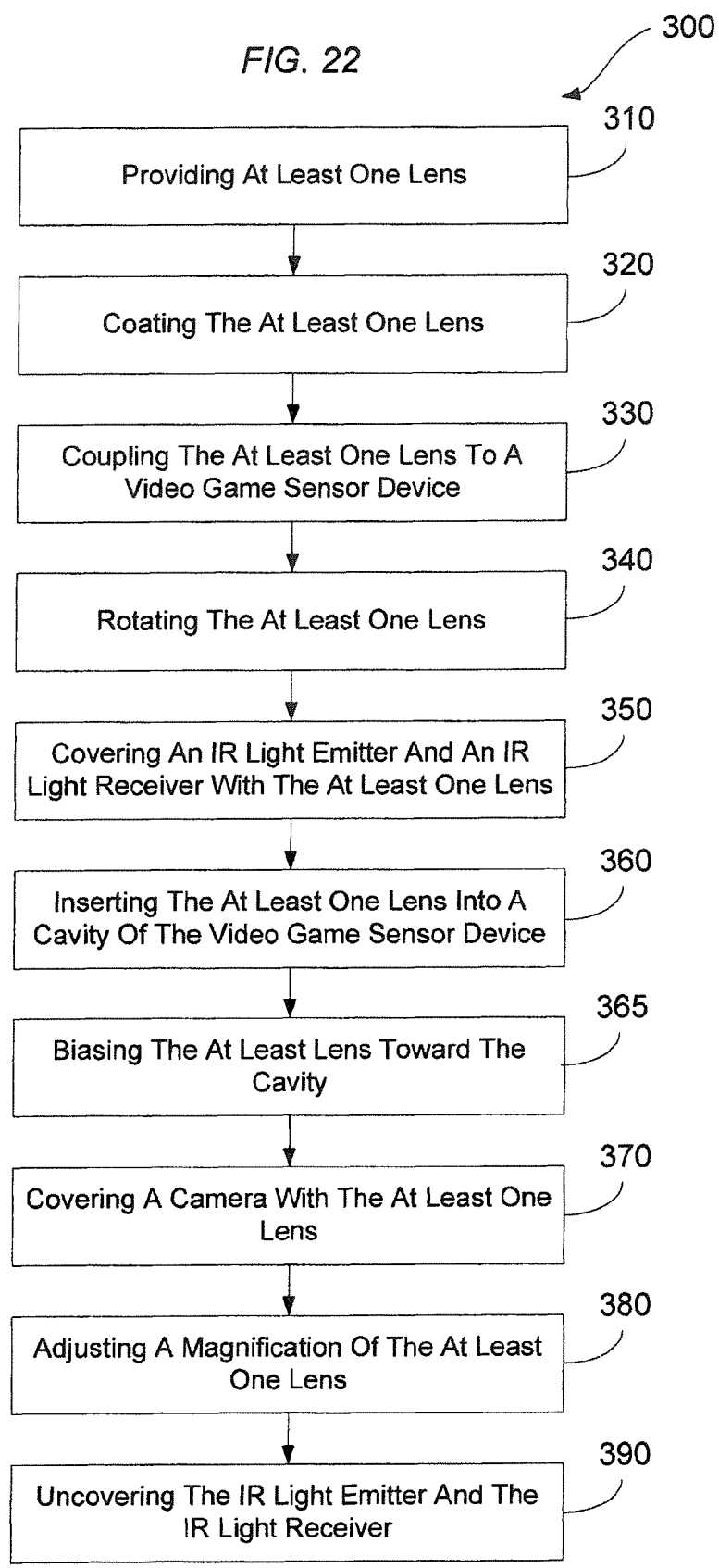

A  B

LENS ACCESSORY FOR VIDEO GAME SENSOR DEVICE

CROSS-REFERENCE TO RELATED APPLICATION

This application is a continuation of U.S. patent application Ser. No. 13/153,341, filed on Jun. 3, 2011, now U.S. Pat. No. 8,123,622, the entire contents of which are incorporated herein by reference.

FIELD

Aspects of embodiments of the present invention relate to a lens accessory for a video game sensor device, and more particularly to a lens accessory for adjusting a sensing distance of a video game sensor device.

BACKGROUND

As the computer gaming market continues to grow, improvements to existing gaming systems as well as new systems are introduced. One computer gaming device recently introduced to the market is the KINECT sensor device for use with the XBOX 360 video game platform, both produced by Microsoft Corporation. KINECT is a trademark of Microsoft Corporation, Redmond, Wash. XBOX 360 is a registered trademark of Microsoft Corporation, Redmond, Wash. The KINECT sensor device allows a user to control and interact with the XBOX 360 through the use of gestures and spoken commands, without the need to touch a game controller. The KINECT sensor device uses an infrared depth sensor for three-dimensional motion capture of a user, and the user must remain within a certain range of distance from the sensor device, depending on the user's body height.

In addition to the computer gaming market continuing to grow in popularity, with the increasing transportability and the decreasing costs of video game systems and video display devices for use therewith, it has become common to play video games in a variety of locations other than one's living room. For example, a user may wish to play a video game in a small space, such as in an office, a vehicle, or simply a small room, where physical constraints require that the user be in close proximity to a sensor device of the video game system. As such, for use of some systems including a video game sensor device such as the KINECT, it is desirable to be able to adjust a playing distance between the user and the video game sensor device.

SUMMARY

According to an aspect of embodiments of the present invention, a lens accessory for a video game sensor device is configured to adjust a sensing distance of the video game sensor device, thereby allowing a user to modify a playing distance from the video game sensor device. According to another aspect of the present invention, the lens accessory is quickly and easily mountable to the video game sensor device. According to another aspect of the present invention, the lens accessory may be movable between an adjusting position and a non-adjusting position without removing the lens accessory from the video game sensor device. According to another aspect of the present invention, a magnification of the lens accessory may be adjustable so that the sensing distance of the video game sensor may be adjusted by various degrees.

According to one exemplary embodiment of the present invention, a lens accessory for a video game sensor device includes a first lens configured to cover an infrared light emitter of the video game sensor device; a second lens configured to cover an infrared light receiver of the video game sensor device; and a body portion coupling the first lens and the second lens together, the body portion being removably attachable to the video game sensor device, wherein the first lens and the second lens have a magnification for adjusting a sensing distance of the video game sensor device.

The body portion may be elastically deformable and configured to clip onto the video game sensor device.

In one embodiment, the first lens and the second lens are at least partially insertable in at least one recess of the video game sensor device at locations corresponding to the infrared light emitter and the infrared light receiver. The lens accessory may further include at least one biasing member configured to bias the first lens and the second lens toward the at least one recess of the video game sensor device.

The first lens and the second lens may be arranged at an angle relative to each other such that a center axis of the first lens and a center axis of the second lens cross each other at a convergence point.

In one embodiment, the lens accessory further includes a third lens coupled to the body portion and configured to cover a camera of the video game sensor device.

In one embodiment, the body portion includes a hinge configured to move the first and second lens portions from respective first positions in which the first and second lens portions cover the infrared light emitter and the infrared light receiver, respectively, to respective second positions in which the first and second lens portions do not cover the infrared light emitter and the infrared light receiver.

The first lens and the second lens may be coated with a coating material configured to block non-infrared light. The magnification of the first lens and the second lens may be about 0.5× to about 0.7×. At least one of the first lens or the second lens may include a plurality of lens elements. The magnification of the first lens and the second lens may be adjustable.

According to another exemplary embodiment of the present invention, a video game sensor device includes an infrared light emitter configured to emit infrared light; an infrared light receiver configured to receive infrared light; and a lens apparatus coupled to the infrared light emitter and the infrared light receiver and including at least one lens having a magnification for adjusting a sensing distance of the video game sensor device.

In one embodiment, the video game sensor device further includes a casing housing the infrared light emitter and the infrared light receiver, the at least one lens includes a first lens covering the infrared light emitter, and a second lens covering the infrared light receiver, and the lens apparatus further includes a body portion on the housing and coupling the first lens and the second lens together.

In one embodiment, the video game sensor device further includes a camera, and the at least one lens further includes a third lens covering the camera. In one embodiment, the casing has at least one cavity at a location corresponding to at least one of the infrared light emitter and the infrared light receiver, and at least one of the first lens or the second lens is at least partially received in the at least one cavity, and the lens apparatus further includes a biasing mechanism biasing the at least one of the first lens or the second lens toward the at least one cavity.

In one embodiment, the lens apparatus is movable relative to the infrared light emitter and the infrared light receiver between a first position in which the at least one lens covers the infrared light emitter and the infrared light receiver and a second position in which the at least one lens does not cover the infrared light emitter and the infrared light receiver.

The at least one lens may be coated with a coating material configured to block non-infrared light. The magnification of the at least one lens may be about 0.5× to about 0.7×. The magnification of the at least one lens may be adjustable.

According to another exemplary embodiment of the present invention, a method of adjusting a sensing distance of a video game sensor device includes providing at least one lens having a magnification, and covering an infrared light emitter and an infrared light receiver of the video game sensor device with the at least one lens.

In one embodiment, the method further includes covering a camera of the video game sensor device with the at least one lens. In one embodiment, the method further includes removably coupling the at least one lens to the video game sensor device.

Covering the infrared light emitter and the infrared light receiver with the at least one lens may include rotating the at least one lens relative to the video game sensor device via a hinge from a second position in which the at least one lens does not cover the infrared light emitter and the infrared light receiver to a first position in which the at least one lens covers the infrared light emitter and the infrared light receiver. In one embodiment, the method further includes rotating the at least one lens relative to the video game sensor device from the first position to the second position. In one embodiment, the method further includes adjusting the magnification of the at least one lens. The method may further include at least partially inserting the at least one lens into at least one cavity of the video game sensor device corresponding to at least one of the infrared light emitter and the infrared light receiver. In one embodiment, the method further includes biasing the at least one lens toward the at least one cavity using a biasing mechanism.

Other features and advantages of embodiments of the present invention will become apparent from the following detailed description, taken in conjunction with the accompanying drawings which illustrate, by way of example, features and aspects of exemplary embodiments of the present invention.

BRIEF DESCRIPTION OF THE DRAWINGS

The above and other features, aspects, and advantages of the present invention will become better understood with regard to the following description, appended claims, and accompanying drawings where:

FIG. 22 is a flowchart of a method of adjusting a sensing distance of a video game sensor device according to an embodiment of the present invention;

DETAILED DESCRIPTION

Figure 1:
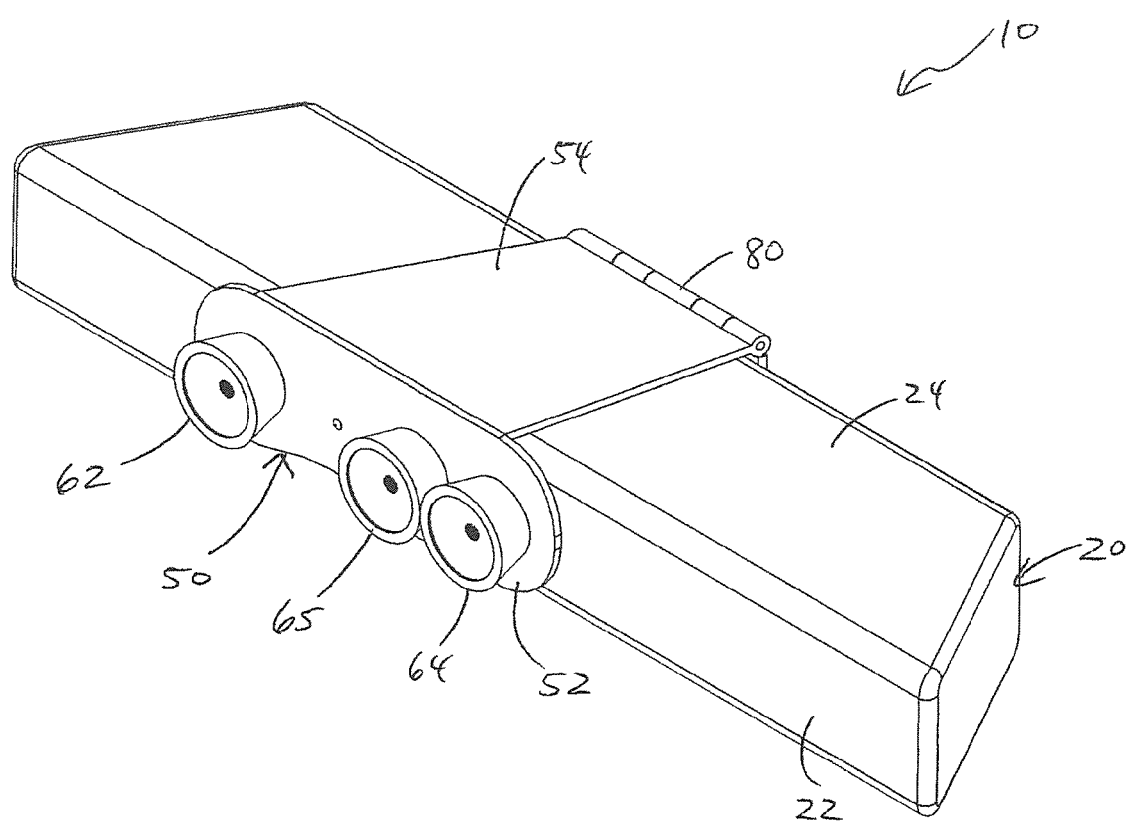
FIG. 1 is a top perspective view of a video game sensor device including a lens apparatus according to an embodiment of the present invention, the lens apparatus being shown in an adjusting position.
Figure 2:
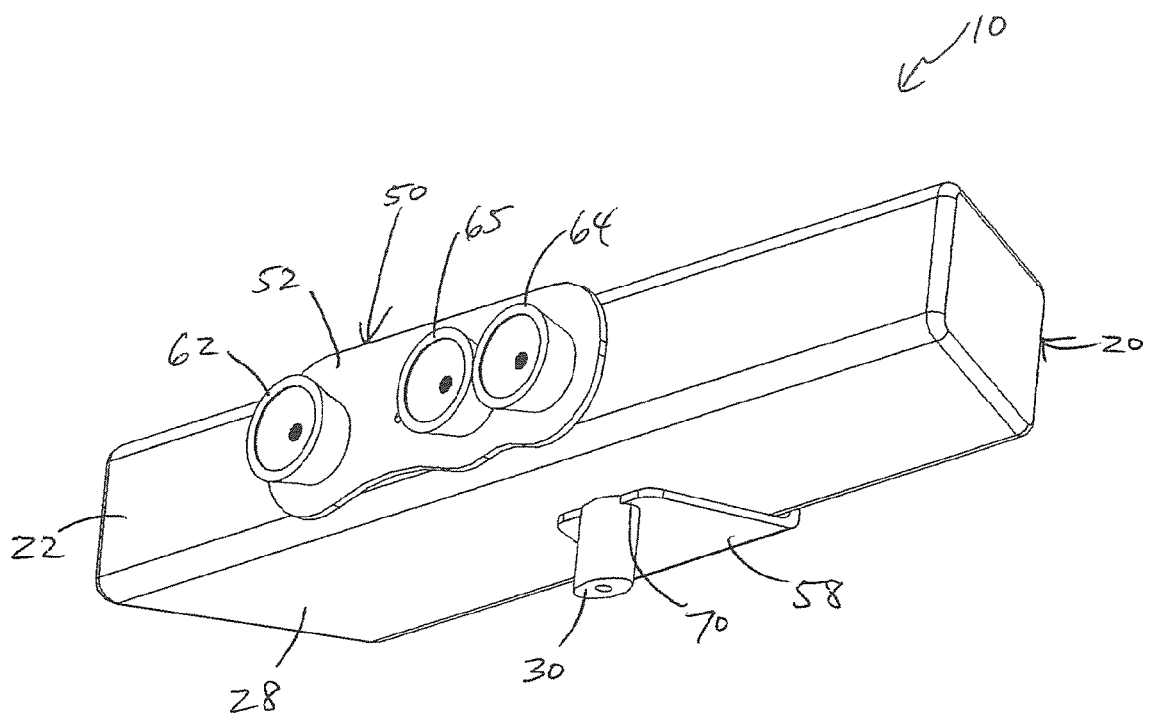
FIG. 2 is a bottom perspective view of the video game sensor device of FIG. 1, the lens apparatus being shown in the adjusting position.
Figure 3:
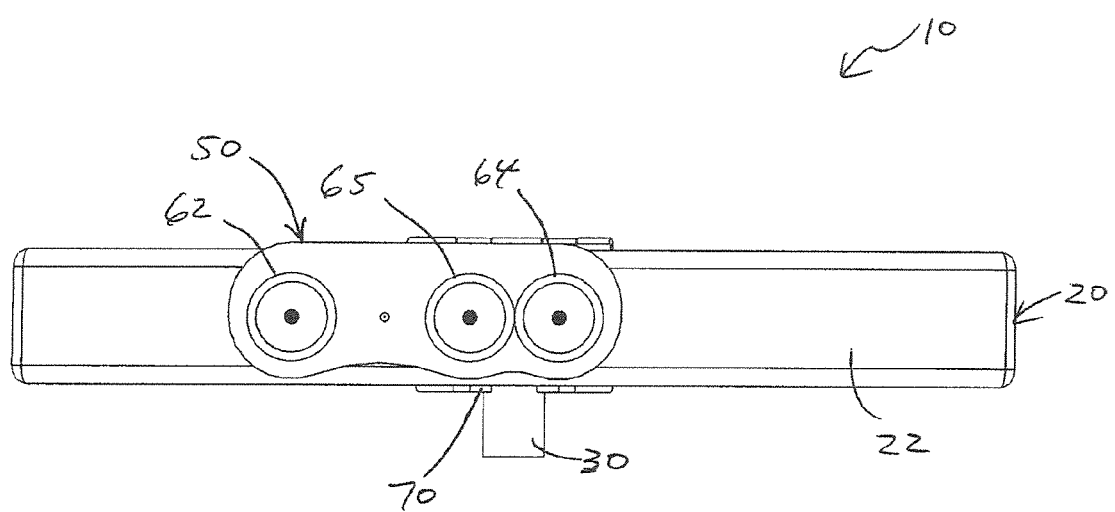
FIG. 3 is a front view of the video game sensor device of FIG. 1, the lens apparatus being shown in the adjusting position.

In the following detailed description, certain exemplary embodiments of the present invention are shown and described, by way of illustration. As those skilled in the art would recognize, the described exemplary embodiments may be modified in various ways without departing from the spirit and scope of the present invention. Accordingly, the drawings and description are to be regarded as illustrative in nature, rather than restrictive. Further, terms such as "upper," "lower," "front," "back," "top," "bottom," "upward," and "downward" are used herein for the purpose of more clearly describing the location and/or orientation of components or features relative to others, as shown in the drawings, for example. However, the use of such terms is not intended or to be regarded as limiting the use of the invention to any particular position or orientation.

With reference to FIGS. 1-4, a video game sensor device 10 according to one exemplary embodiment of the present invention includes a lens apparatus 50. In one embodiment, the lens apparatus 50 is movable between an adjusting position, as shown in FIGS. 1-4, in which at least one lens of the lens apparatus 50 covers at least one of an infrared light emitter 42, an infrared light receiver 44, and a camera 45 of the video game sensor device 10, and a non-adjusting position (see FIGS. 5-8) in which the lens apparatus 50 does not cover the infrared light emitter 42, the infrared light receiver 44, and the camera 45.

With reference to FIGS. 5-8, the video game sensor device 10 includes a casing 20 which houses the infrared light emitter 42, the infrared light receiver 44, and the camera 45. In one embodiment, the casing 20 has a generally rectangular or trapezoidal prismatic shape including a front side 22, a top side 24, a rear side 26, and a bottom side 28. The infrared light emitter 42, the infrared light receiver 44, and the camera 45, in one embodiment, are facing the front side 22, and the front side 22 may have one or more openings exposing the infrared light emitter 42, the infrared light receiver 44, and the camera 45. Further, in one embodiment, the casing 20 of the video game sensor device 10 includes a support post 30 coupled to the bottom side 28 for supporting the video game sensor device 10 on a support base, for example.

With further reference to FIGS. 1-4, the lens apparatus 50 includes a body portion including a front side 52, a top side 54, a rear side 56, and a bottom side 58 that are spaced apart from one another and configured similarly to the respective front side 22, top side 24, rear side 26, and bottom side 28 of the casing 20 and are mounted thereto. The body portion may be made of a thermoplastic material (e.g., SABIC PC/ABS C6200) or any other suitable material. The lens apparatus 50 further includes a first lens 62, a second lens 64, and, in one embodiment, a third lens 65 coupled to the front side 52. In one embodiment, the first lens 62, the second lens 64, and the third lens 65 are configured to cover the infrared light emitter 42, the infrared light receiver 44, and the camera 45, respectively, for adjusting a sensing distance of the video game sensor device 10. Each of the first lens 62, the second lens 64, and the third lens 65 has a magnification, and, in one embodiment, the magnification of each is the same. The magnification may be selected depending on the amount by which the sensing distance of the video game sensor device 10 is desired to be adjusted. For example, where it is desired that the sensing distance of the video game sensor device 10 be adjusted to be less (e.g., for use in a small room), the first lens 62, the second lens 64, and the third lens 65 may have a magnification of less than 1×. For example, in one embodiment, the first lens 62, the second lens 64, and the third lens 65 may have a magnification of about 0.5× to about 0.7×. In one embodiment, the first lens 62, the second lens 64, and the third lens 65 have a magnification of about 0.6×. However, the present invention is not limited thereto and, in other embodiments, the first lens 62, the second lens 64, and the third lens 65 may have any other suitable magnification. Further, in another embodiment, if it is desired that the sensing distance of the video game sensor device 10 be adjusted to be greater, the first lens 62, the second lens 64, and the third lens 65 may have a magnification of greater than 1×. Further, in one embodiment, the first lens 62, the second lens 64, and the third lens 65 may have a magnification that is adjustable. Further, in one embodiment, the first lens 62, the second lens 64, and the third lens 65 may be coated with a coating material that is configured to block non-infrared light.

The lens apparatus 50 is coupled (e.g., removably attached) to a video game sensor device and, in one embodiment, includes a clip portion 70. The clip portion 70 may be configured as a pair of opposing hooks 72 having an opening 74 therebetween receiving the support post 30 therein. The hooks 72 may be elastically deformable for receiving the support post therebetween and for clamping around the support post 30 for attachment of the lens apparatus 50 to the support post 30. However, embodiments of the present invention are not limited to the clip portion 70 described above and shown in the drawings. Rather, in other embodiments, the lens apparatus 50 may include any other suitable clip portion or other attachment device or method, or combination thereof, for removably or permanently attaching the lens apparatus 50 to the casing 20. Further, in one embodiment, the casing 20 and the lens apparatus 50 may be integrally manufactured as a unit.

While, in one embodiment, the casing 20 and the lens apparatus 50 each have four sides forming a generally rectangular cross-sectional shaped body, the present invention is not limited thereto. That is, in other embodiments, one or both of the casing 20 or the lens apparatus 50 may have any suitable shape or number of sides for coupling to one another. Further, in one embodiment the casing 20, the infrared light emitter 42, the infrared light receiver 44, and the camera 45 may be configured the same or similarly to the KINECT, as depicted in FIGS. 1-8, but in other embodiments, may have configurations different from that of the KINECT.

Figure 4:
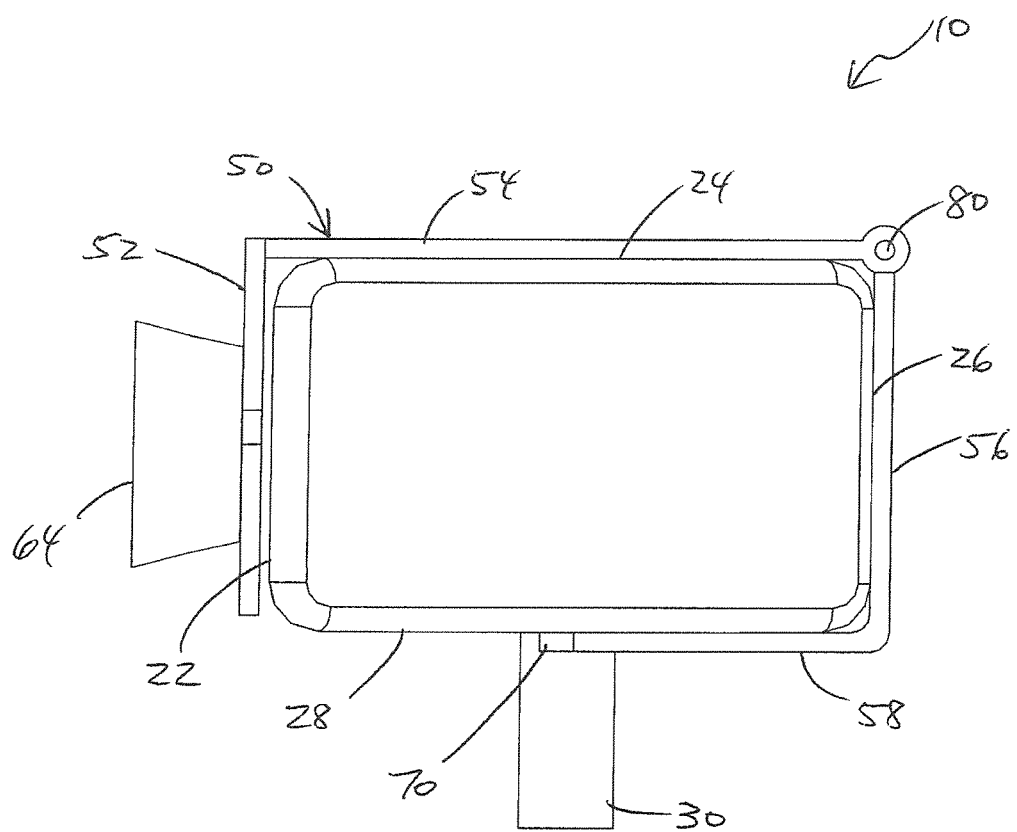
FIG. 4 is side view of the video game sensor device of FIG. 1, the lens apparatus being shown in the adjusting position.
Figure 5:
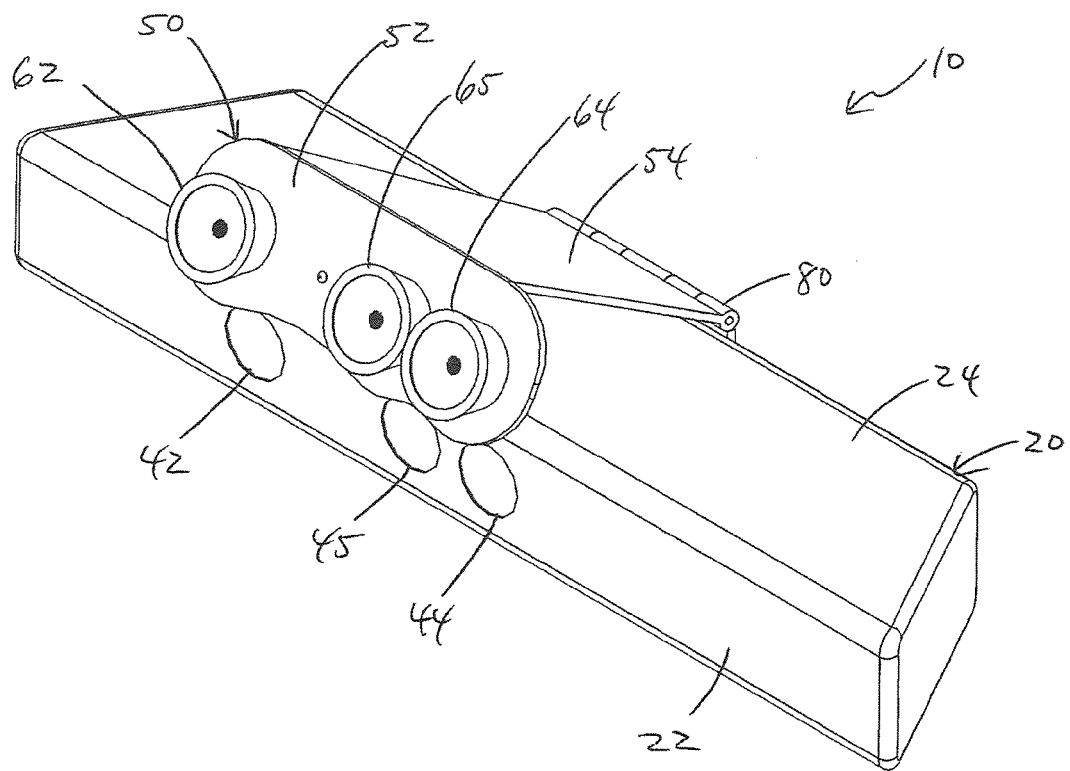
FIG. 5 is a top perspective view of the video game sensor device of FIG. 1, the lens apparatus being shown in a non-adjusting position.
Figure 6:
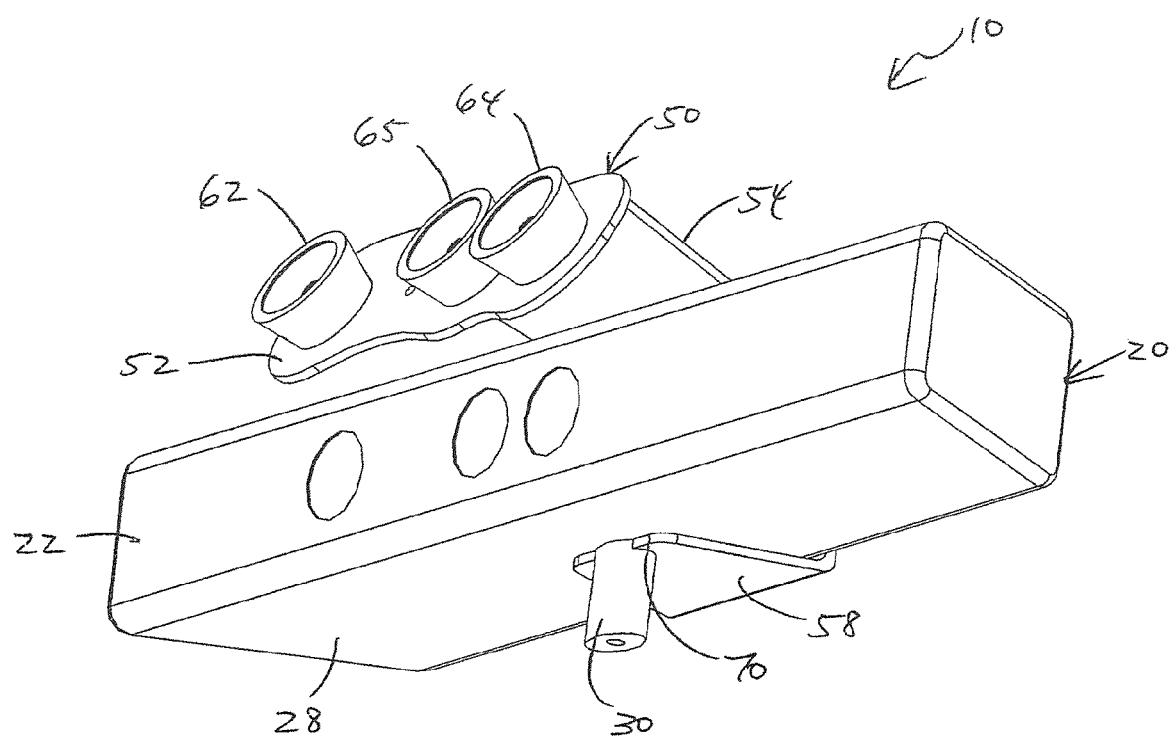
FIG. 6 is a bottom perspective view of the video game sensor device of FIG. 1, the lens apparatus being shown in the non-adjusting position.
Figure 7:
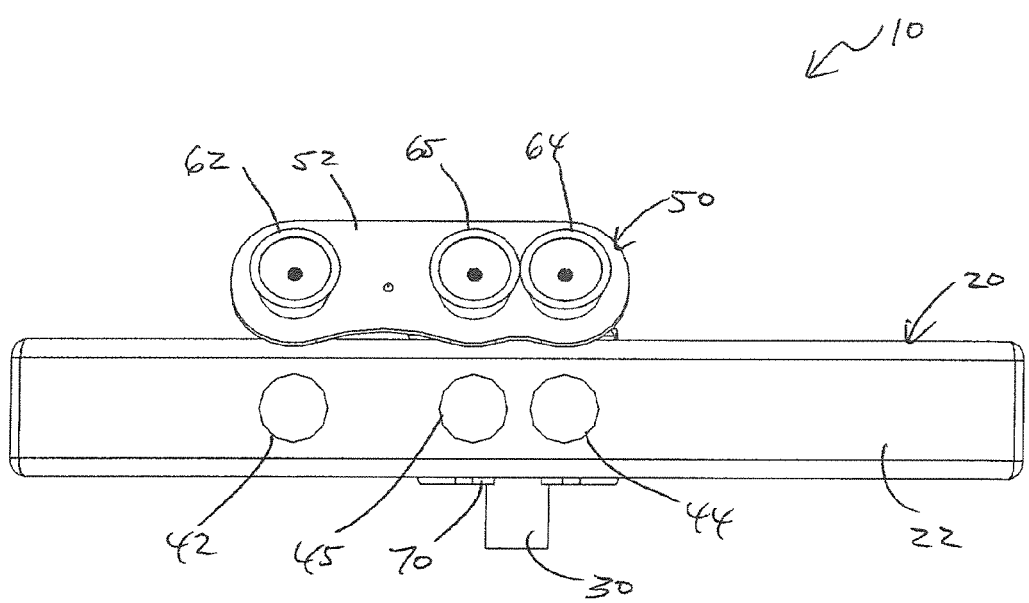
FIG. 7 is a front view of the video game sensor device of FIG. 1, the lens apparatus being shown in the non-adjusting position.
Figure 8:
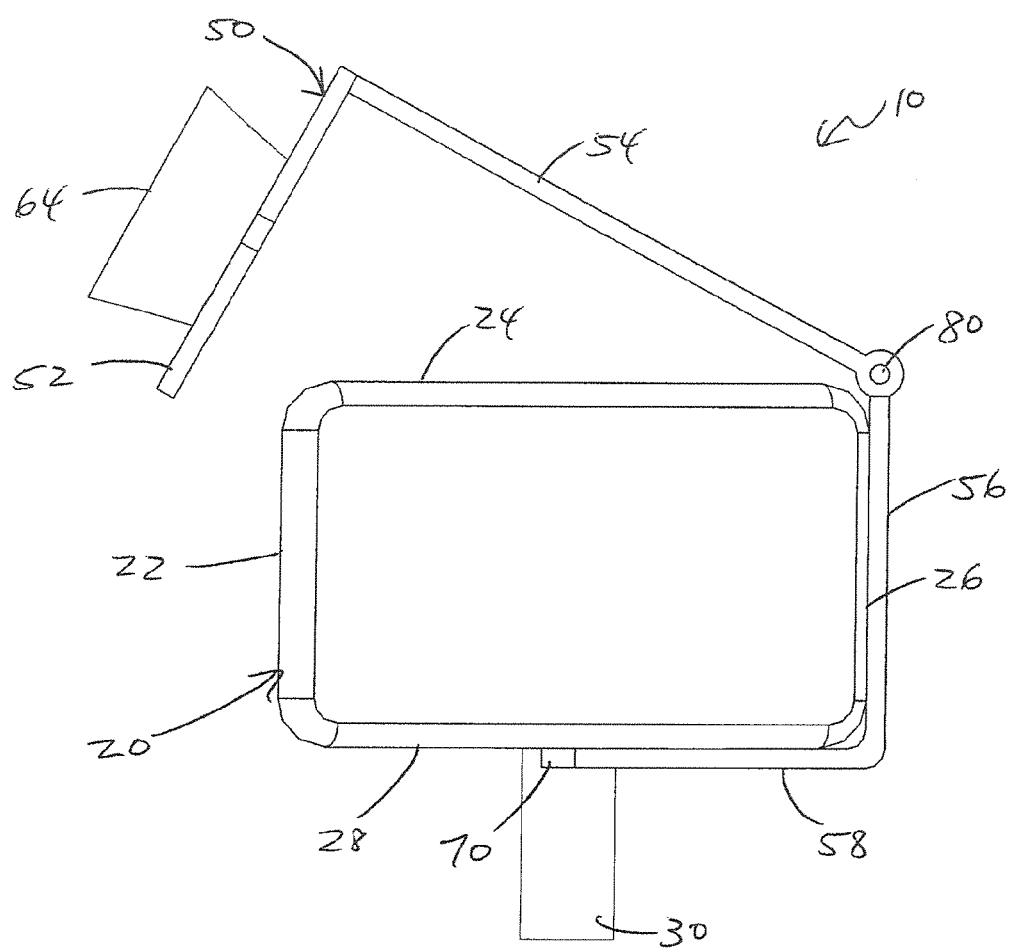
FIG. 8 is a side view of the video game sensor device of FIG. 1, the lens apparatus being shown in the non-adjusting position.

In one embodiment, as shown in FIGS. 4 and 8, for example, the front side 52 is connected to the top side 54, the top side 54 is rotatably connected to the rear side 56 via a hinge 80, and the rear side 56 is connected to the bottom side 58. In one embodiment, the top side 54 is rotatable together with the first lens 62, the second lens 64, and the third lens 65 relative to the rear side 56 and the casing 20 via the hinge 80 for moving the first lens 62, the second lens 64, and the third lens 65 between an adjusting position (see FIGS. 1-4) in which the first lens 62, the second lens 64, and the third lens 65 cover the infrared light emitter 42, the infrared light receiver 44, and the camera 45, and a non-adjusting position (see FIGS. 5-8) in which the first lens 62, the second lens 64, and the third lens 65 do not cover the infrared light emitter 42, the infrared light receiver 44, and the camera 45. In other embodiments, the hinge 80 may be located between the front side 52 and the top side 54 or between the rear side 56 and the bottom side 58. In another embodiment, more than one pair of sides may be rotatably connected. Further, in another embodiment, the hinge 80 may be absent, and the lens apparatus 50 may be configured for at least one of the first lens 62, the second lens 64, and the third lens 65 to cover at least one of the infrared light emitter 42, the infrared light receiver 44, and the camera 45 by any other device or method, such as the first lens 62, the second lens 64, and the third lens 65 being slidably movable relative to the infrared light emitter 42, the infrared light receiver 44, and the camera 45.

Figure 9:
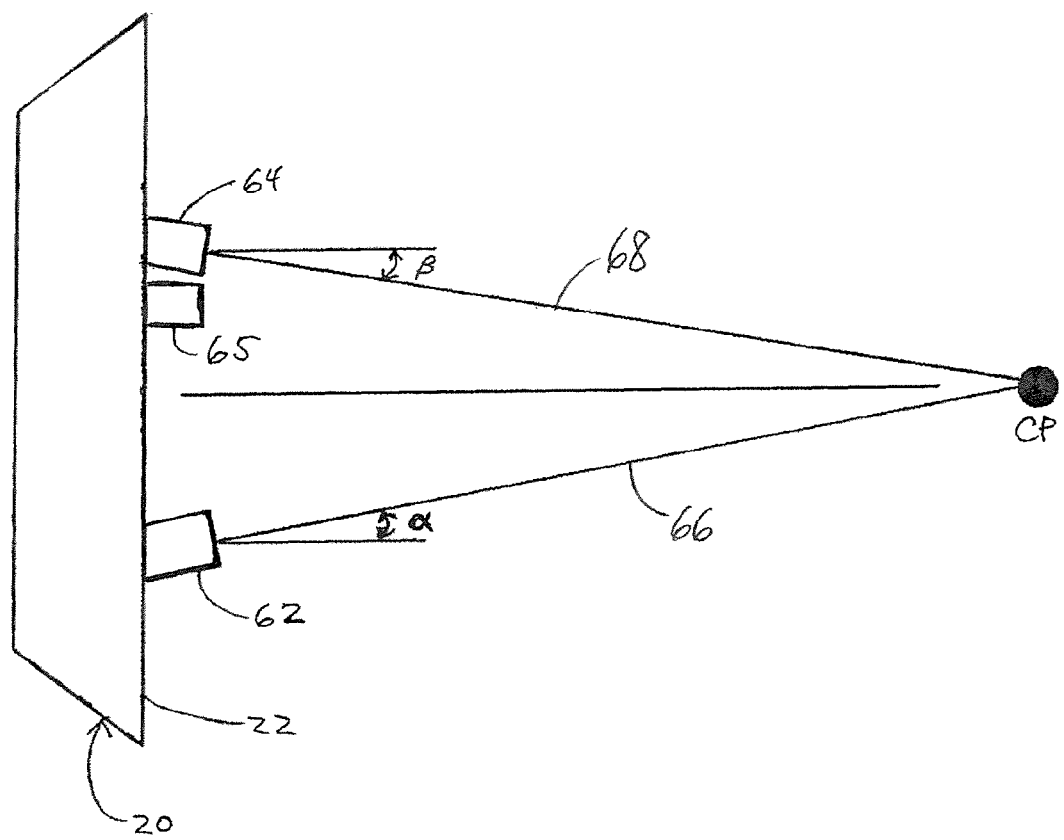
FIG. 9 is a schematic top view of the video game sensor device of FIG. 1, the lens apparatus being shown in the adjusting position.

With reference to FIG. 9, according to one embodiment, the first lens 62 and the second lens 64 of the lens apparatus 50 are oriented at an angle relative to each other such that respective center axes 66 and 68 of the first lens 62 and the second lens 64 cross each other at a convergence point CP. That is, both the first lens 62 and the second lens 64 aim at the convergence point CP. In one embodiment, the center axis 66 of the first lens 62 is oriented at an angle α with respect to an axis perpendicular to the front side 22 of the casing 20 and/or an axis perpendicular to the front side 52 of the lens apparatus 50. Similarly, the center axis 68 of the second lens 64 is oriented at an angle β with respect to an axis perpendicular to the front side 22 of the casing 20 and/or an axis perpendicular to the front side 52 of the lens apparatus 50. In one embodiment, the angles α and β are equal or substantially equal. However, embodiments of the present invention are not limited thereto, and in other embodiments, the angles α and β may be different. In one embodiment, the angles α and β may each be about 1.1 degrees. In one embodiment, respective edges of the first lens 62 (see, for example, edge 162a shown in FIG. 19) and the second lens 64 which abut the front side 22 of the casing 20 are beveled in order to provide the angles α and β. Also, in one embodiment, the respective center axes 66 and 68 of the first lens 62 and the second lens 64 are substantially horizontal, such that the convergence point CP is at substantially a same height as the first lens 62 and the second lens 64. Further, in one embodiment, the first lens 62 and the second lens 64 may be stationary, or fixed, relative to each other, and the angles α and β are constant. Alternatively, in another embodiment, the orientation of one or both of the first lens 62 and the second lens 64 may be moveable (i.e. the angles α and β are variable), such as for adjusting a distance from the lens accessory 50 to the convergence point CP. In another embodiment, the respective center axes 66 and 68 of the first lens 62 and the second lens 64 may not cross each other at a convergence point CP but, rather, each of the first lens 62 and the second lens 64 may be oriented parallel to an axis perpendicular to the front side 22 of the casing 20 and/or an axis perpendicular to the front side 52 of the lens apparatus 50. That is, in one embodiment, each of the angles α and β is 0 degrees.

Figure 10:
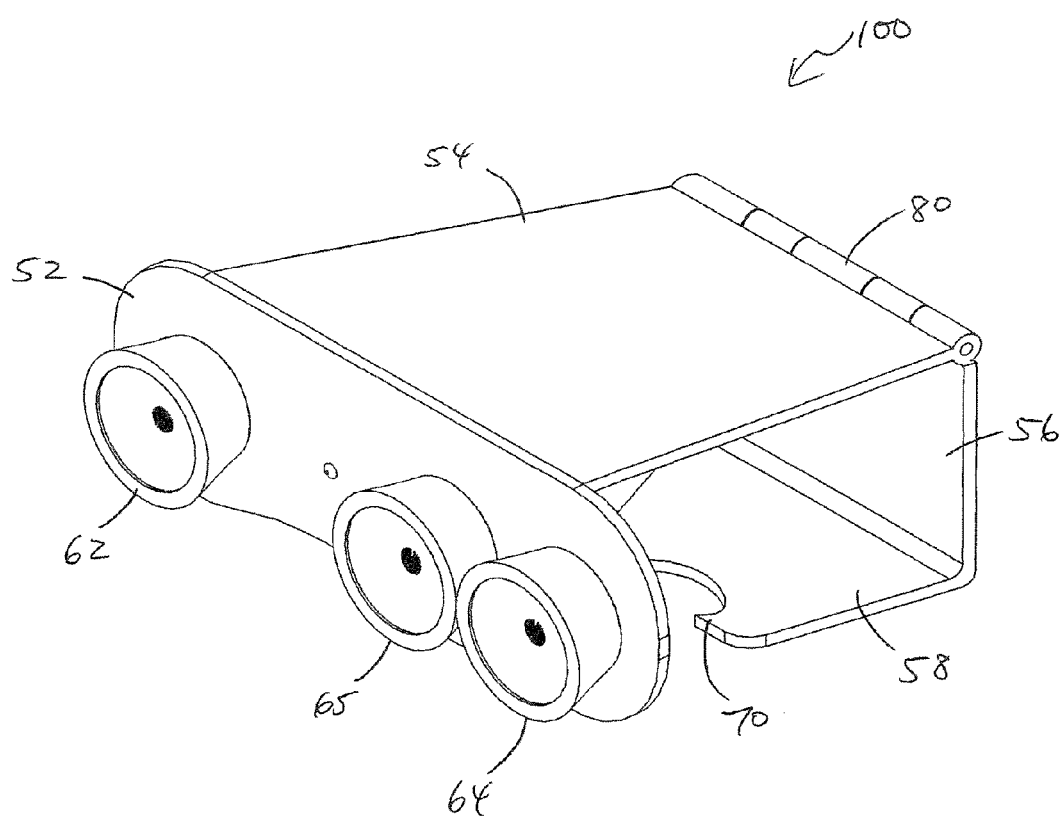
FIG. 10 is a perspective view of a lens accessory for a video game sensor device according to an embodiment of the present invention, the lens accessory being shown in a first position.
Figure 11:
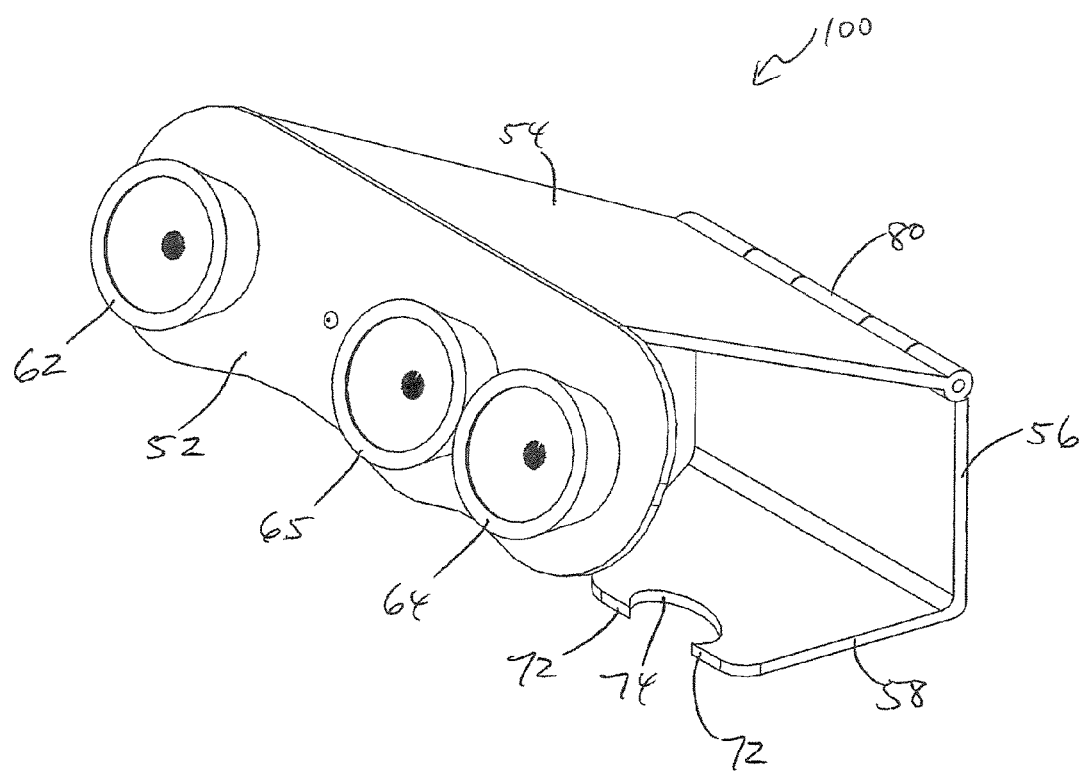
FIG. 11 is a perspective view of the lens accessory of FIG. 10, the lens accessory being shown in a second position.

With reference to FIGS. 10 and 11, a lens accessory 100 according to an embodiment of the present invention is mountable, attachable, or otherwise useable with a video game sensor device for adjusting a sensing distance of the video game sensor device. The lens accessory 100 may be configured as lens goggles mountable on a video game sensor device, such as the KINECT or any other suitable video game sensor device. Furthermore, the lens accessory 100, in one embodiment, as shown in FIGS. 10 and 11, has a same or substantially same configuration as that of the lens apparatus 50 described above and shown in FIGS. 1-9 as a component of the video game sensor device 10. However, embodiments of the present invention are not limited thereto, and in other embodiments, the lens accessory 100 may have any other suitable configuration for covering a video game sensor device and adjusting a sensing distance thereof.

In one embodiment, as shown in FIGS. 10 and 11, the lens accessory 100 has substantially the same configuration as the lens apparatus 50 described above. That is, the lens accessory 100 includes the body portion including the front side 52, the top side 54, the rear side 56, and the bottom side 58, and further includes the first lens 62, the second lens 64, and, in one embodiment, the third lens 65 coupled to the front side 52. The body portion may be made of a thermoplastic material (e.g., SABIC PC/ABS C6200) or any other suitable material. The first lens 62, the second lens 64, and the third lens 65 are configured to cover an infrared light emitter, an infrared light receiver, and a camera, respectively, of a video game sensor device for adjusting a sensing distance of the video game sensor device. Also, as described above with respect to the lens apparatus 50, each of the first lens 62, the second lens 64, and the third lens 65 of the lens accessory may have a magnification that is the same, and in one embodiment, for example, the first lens 62, the second lens 64, and the third lens 65 may have a magnification of about 0.5× to about 0.7×, such as a magnification of about 0.6×. However, in other embodiments, the magnification may be any other desired amount depending on a degree to which the user desires to adjust a sensing distance of a video game sensor device. In one embodiment, the first lens 62, the second lens 64, and the third lens 65 may have a magnification that is adjustable. Further, in one embodiment, the first lens 62, the second lens 64, and the third lens 65 may be coated with a coating material that is configured to block non-infrared light.

The lens accessory 100 is coupleable (e.g., removably attachable) to a video game sensor device and, in one embodiment, includes the clip portion 70. As shown in further detail in FIG. 11, the clip portion 70 may be configured as a pair of opposing hooks 72 having an opening 74 therebetween for receiving a support post of a video game sensor device therein. The hooks 72 may be elastically deformable for receiving the support post therebetween and for clamping around the support post for attachment of the lens accessory 100 to the support post. However, embodiments of the present invention are not limited to the clip portion 70 described above and shown in the drawings. Rather, in other embodiments, the lens accessory 100 may include any other suitable clip portion or other attachment device or method, or combination thereof, for removably or permanently attaching the lens accessory 100 to a video game sensor device.

While in one embodiment the lens accessory 100 has four sides forming a generally rectangular cross-sectional shaped body, the present invention is not limited thereto. That is, in other embodiments, the lens accessory 100 may have any suitable shape or number of sides for coupling with any of various video game sensor devices, which may have configurations different from that of the KINECT, the general shape of which is depicted in FIGS. 1-9 as the housing 20 of the video game sensor device 10. Further, in one embodiment, as shown in the drawings, the front side 52 is connected to the top side 54, the top side 54 is rotatably connected to the rear side 56 via the hinge 80, and the rear side 56 is connected to the bottom side 58. However, in other embodiments, the hinge 80 may be located between the front side 52 and the top side 54 or between the rear side 56 and the bottom side 58. In another embodiment, more than one pair of sides may be rotatably connected. Further, in another embodiment, the hinge 80 may be absent, and the lens accessory 100 may be configured for at least one of the first lens 62, the second lens 64, and the third lens 65 to cover at least one of an infrared light emitter, an infrared light receiver, and a camera of a video game sensor device by any other device or method, such as the first lens 62, the second lens 64, and the third lens 65 being slidably movable relative to the infrared light emitter, the infrared light receiver, and the camera.

Figure 12:
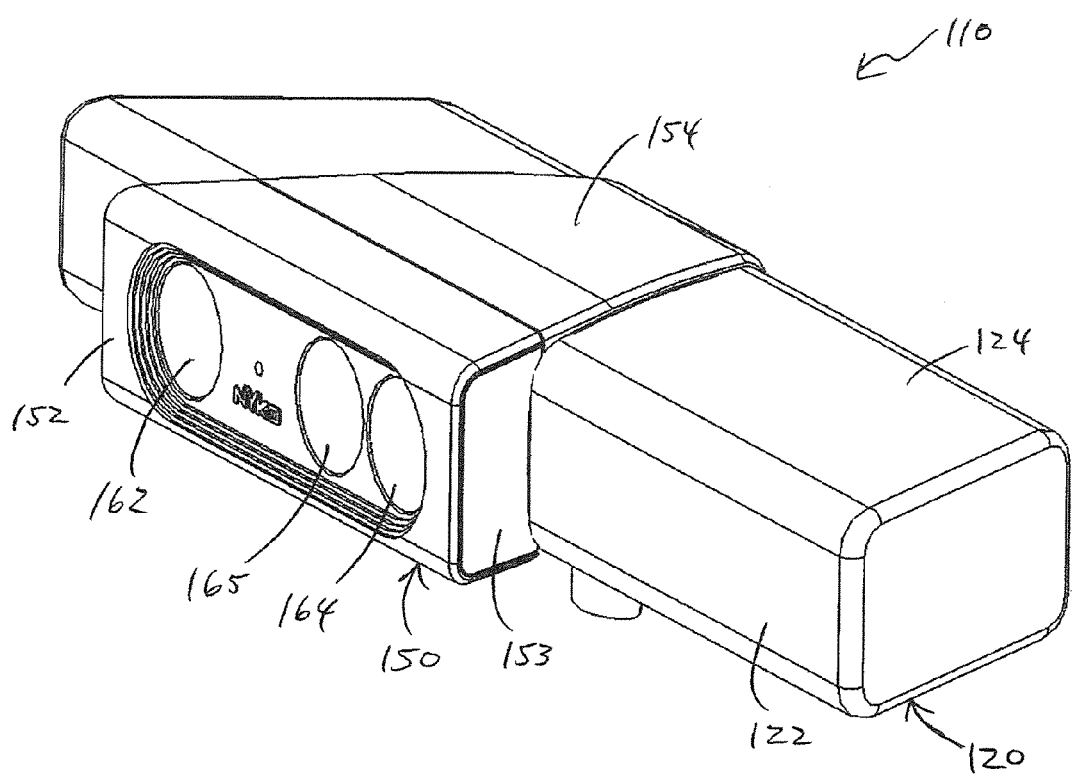
FIG. 12 is a top perspective view of a video game sensor device including a lens apparatus according to another embodiment of the present invention, the lens apparatus being shown in an adjusting position.
Figure 13:
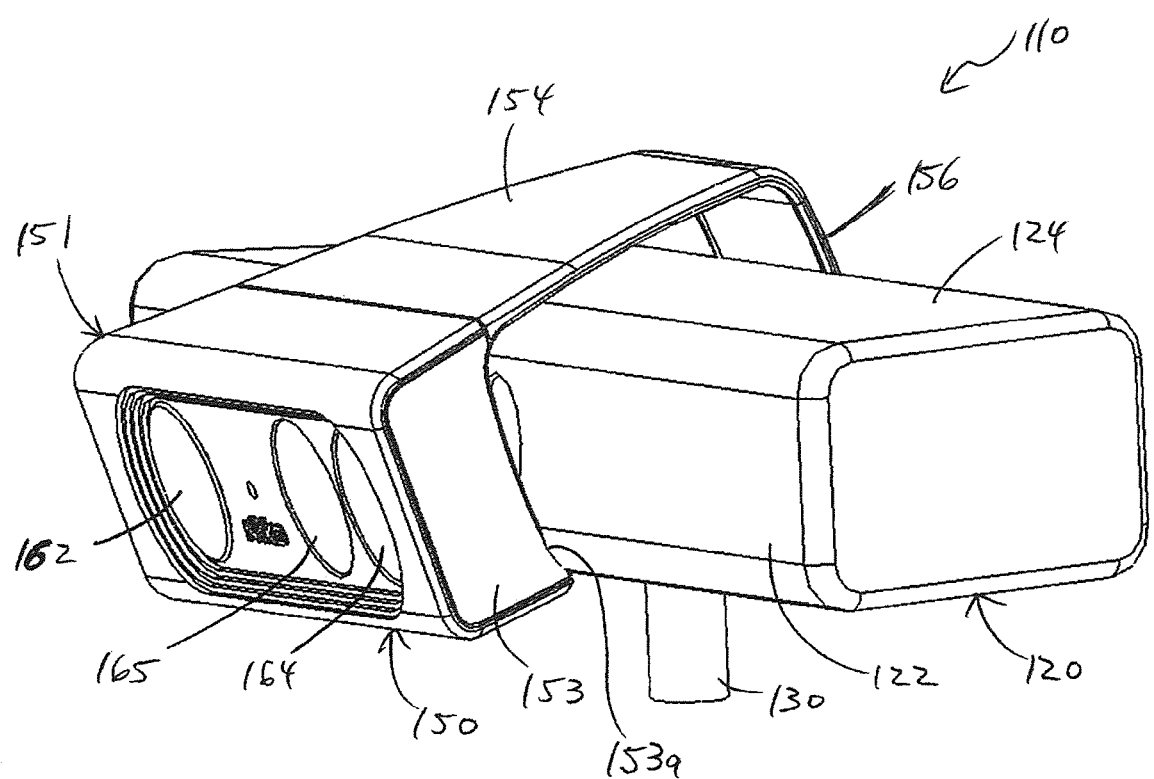
FIG. 13 is a top perspective view of the video game sensor device of FIG. 12, the lens apparatus being shown in a partially uncoupled position.

With reference to FIGS. 12-17, a video game sensor device 110 according to another exemplary embodiment of the present invention includes a lens apparatus 150. In one embodiment, the lens apparatus 150 is movable or detachably coupleable to a casing 120 of the video game sensor device 110 between an adjusting position, as shown in FIG. 12, in which at least one lens of the lens apparatus 150 covers at least one of an infrared light emitter 142, an infrared light receiver 144, and a camera 145 of the video game sensor device 110, and a non-adjusting position in which the lens apparatus 150 does not cover the infrared light emitter 142, the infrared light receiver 144, and the camera 145, such as where the lens apparatus 150 is uncoupled from the casing 120. FIG. 13 shows the lens apparatus 150 partially uncoupled from the casing 120. That is, in FIG. 13, a front portion of the lens apparatus 150 is coupled to the casing 120, but a rear portion is detached, or unclipped, from the casing 120.

With reference to FIGS. 12-17, the video game sensor device 110 includes a casing 120 which houses the infrared light emitter 142, the infrared light receiver 144, and the camera 145. In one embodiment, the casing 120 has a generally rectangular or trapezoidal prismatic shape including a front side 122, a top side 124, a rear side 126, and a bottom side 128. The infrared light emitter 142, the infrared light receiver 144, and the camera 145, in one embodiment, are facing the front side 122, and the front side 122 has one or more openings exposing the infrared light emitter 142, the infrared light receiver 144, and the camera 145. Further, in one embodiment, the casing 120 of the video game sensor device 110 includes a support post 130 coupled to the bottom side 128 for supporting the video game sensor device 110 on a support base, for example.

The lens apparatus 150 includes a body portion including a front side 152, a top side 154, a rear side 156, and a bottom side 158 that are spaced apart from one another and configured similarly to the respective front side 122, top side 124, rear side 126, and bottom side 128 of the casing 120 and are mounted thereto. The lens apparatus 150 further includes a first lens 162, a second lens 164, and, in one embodiment, a third lens 165 coupled to the front side 152. In one embodiment, the first lens 162, the second lens 164, and the third lens 165 are configured to cover the infrared light emitter 142, the infrared light receiver 144, and the camera 145, respectively, for adjusting a sensing distance of the video game sensor device 110. Each of the first lens 162, the second lens 164, and the third lens 165 has a magnification, and, in one embodiment, the magnification of each is the same. The magnification may be selected depending on the amount by which the sensing distance of the video game sensor device 110 is desired to be adjusted. For example, where it is desired that the sensing distance of the video game sensor device 110 be adjusted to a shorter distance (e.g., for use in a small room), the first lens 162, the second lens 164, and the third lens 165 may have a magnification of less than 1×. For example, in one embodiment, the first lens 162, the second lens 164, and the third lens 165 may have a magnification of about 0.5× to about 0.7×. In one embodiment, the first lens 162, the second lens 164, and the third lens 165 have a magnification of about 0.6×. However, the present invention is not limited thereto and, in other embodiments, the first lens 162, the second lens 164, and the third lens 165 may have any other suitable magnification. Further, in another embodiment, if it is desired that the sensing distance of the video game sensor device 110 be adjusted to be a greater distance, the first lens 162, the second lens 164, and the third lens 165 may have a magnification of greater than 1×. Further, in one embodiment, the first lens 162, the second lens 164, and the third lens 165 may have a magnification that is adjustable. Further, in one embodiment, the first lens 162, the second lens 164, and the third lens 165 may be coated with a coating material that is configured to block non-infrared light.

The lens apparatus 150 is coupled (e.g., removably attached) to a video game sensor device and, in one embodiment, includes a clip portion 170. The clip portion 170, in one embodiment, may be configured as a concave rounded edge portion which is curved inward from an end of the rear side 156 for being attached or clipped to an intersecting region of the rear and bottom sides 126 and 128 of the casing 120. The body portion of the lens apparatus 150 including the clip portion 170 may be elastically deformable for being clipped onto the casing 120 and, in one embodiment, for being held on the casing 120 by elastic force. That is, the body portion and/or the clip portion 170 may, for example, be made of a thermoplastic material (e.g., SABIC PC/ABS C6200) or another elastically deformable material. However, embodiments of the present invention are not limited to the clip portion 170 described above and shown in the drawings. Rather, in other embodiments, the lens apparatus 150 may include any other suitable clip portion or other attachment device or method, or combination thereof, for removably or permanently attaching the lens apparatus 150 to the casing 120. Further, in one embodiment, the casing 120 and the lens apparatus 150 may be integrally manufactured as a unit. In another embodiment, one or more pairs of sides of the lens apparatus 150 may be rotatably connected to one another, similar to the lens apparatus 50 described above.

Figure 14:
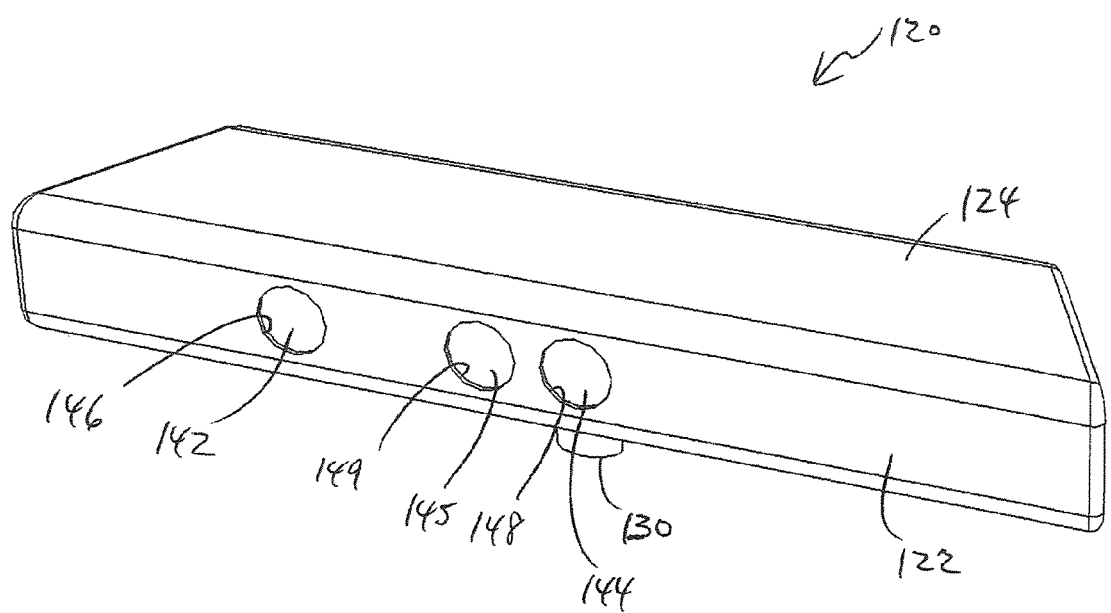
FIG. 14 is a schematic perspective view of a casing, an infrared light emitter, an infrared light receiver, and a camera of the video game sensor device of FIG. 12.

In one embodiment, the casing 120 and the lens apparatus 150 each have four sides forming a generally rectangular cross-sectional shaped body. However, the casing 120 of the video game sensor device 110 is not limited to the configuration shown in FIG. 14. In other embodiments, the casing 120 may have any suitable shape and number of sides, and the lens apparatus 150 may also have any other suitable shape for attachment to the casing 120. Further, in one embodiment, the casing 120, the infrared light emitter 142, the infrared light receiver 144, and the camera 145 may be configured the same or similarly to the KINECT, as depicted in FIG. 14, but in other embodiments, may have configurations different from that of the KINECT.

Figure 15:
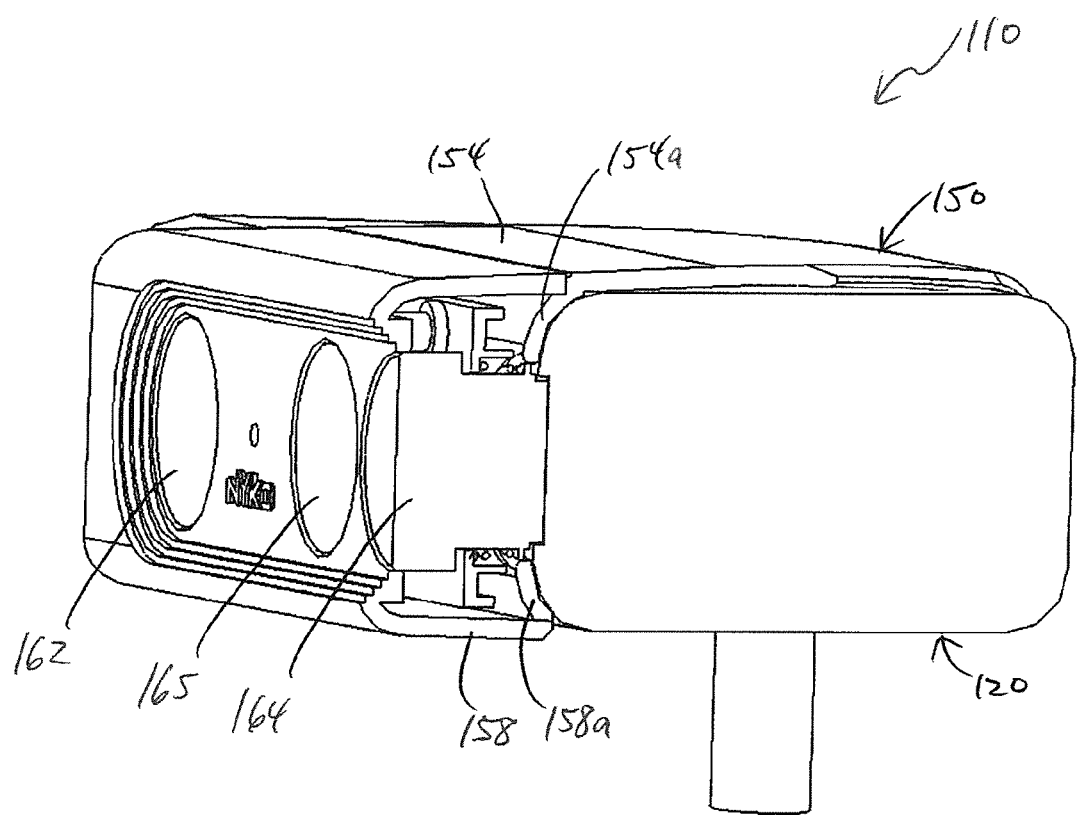
FIG. 15 is a sectional perspective view of the video game sensor device of FIG. 12.
Figure 16:
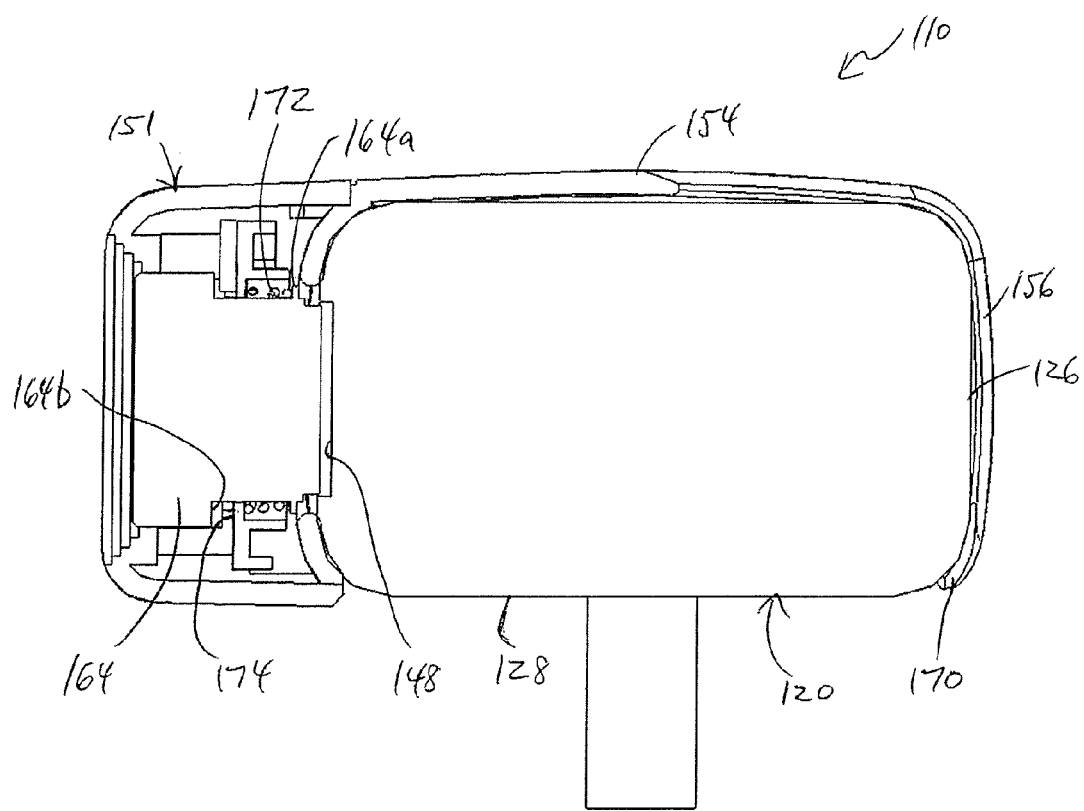
FIG. 16 is a sectional side view of the video game sensor device of FIG. 12, a lens of the lens apparatus being shown outside a cavity of the casing.

In one embodiment, as shown in FIGS. 15 and 16, for example, the bottom side 158 is connected to the front side, the front side 152 is connected to the top side 154, the top side 154 is connected to the rear side 156, and the rear side 156 is connected to the clip portion 170. Further, with reference to FIG. 13, for example, the lens apparatus 150 may include a front housing portion 151 housing the first lens 162, the second lens 164, and the third lens 165. In one embodiment, the front housing portion 151 includes the front side 152, the bottom side 158, a portion of the top side 154, and a pair of side walls 153 at opposite sides of the front housing portion 151. The side walls 153 may have a contoured edge 153a having one or more curved portions corresponding to one or more curved portions of the casing 120, such as curved intersecting portions between the front and top sides 122, 124 and the front and bottom sides 122, 128. In one embodiment, the top side 154 includes a downwardly extending concave portion 154a having curvature corresponding to that of a curved intersecting portion between the front and top sides 122, 124 of the casing 120. In one embodiment, the bottom side 158 includes an upwardly extending concave portion 158a having curvature corresponding to that of a curved intersecting portion between the front and bottom sides 122, 128 of the casing 120.

Figure 17:
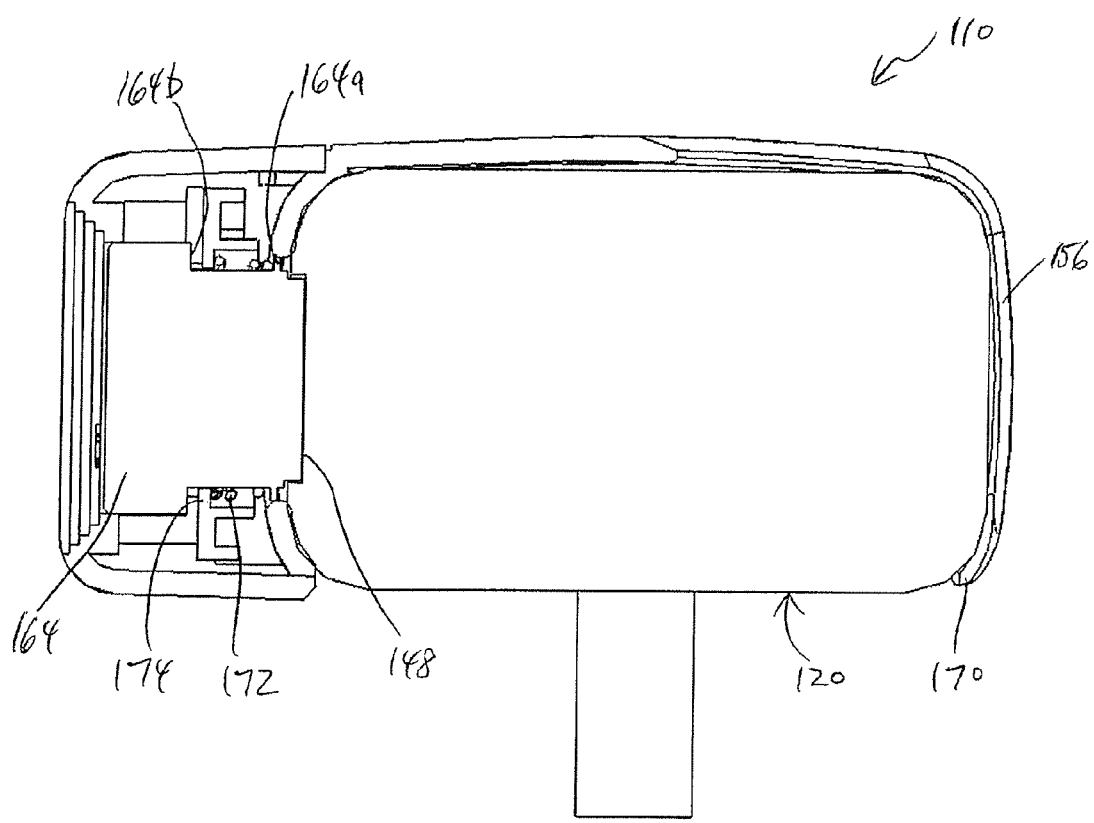
FIG. 17 is a sectional side view of the video game sensor device of FIG. 12, the lens of the lens apparatus being shown received in the cavity of the casing.

In one embodiment, the second lens 164 is at least partially insertable in a cavity 148 adjacent the infrared light receiver 144 (see FIGS. 15 and 17). Similarly, in one embodiment, with reference to FIG. 14, the first lens 162 is partially insertable in a cavity 146 adjacent the infrared light emitter 142, and the third lens 165 is partially insertable in a cavity 149 adjacent the camera 145.

In one embodiment, the lens apparatus 150 includes a biasing mechanism 172, such as a compression spring. The biasing mechanism 172 pushes against a rib or ring 164a of the second lens 164 (see, e.g., FIG. 17) and thereby pushes the second lens 164 toward and into the cavity 148 of the casing 120 adjacent the infrared light receiver 144 and provides a retention force for holding the second lens 164 in the cavity 148 and against a surface in the cavity 148. Further, the second lens 164, in one embodiment, may include a stepped portion 164b configured to abut a surface 174 of the front housing portion 151 when the second lens 164 is not inserted in and pushed against a surface in the cavity 148. In one embodiment, the first lens 162 is biased toward the cavity 146 adjacent the infrared light emitter 142, and the third lens 165 is biased toward the cavity 149 adjacent the camera 145 via a biasing mechanism in a similar manner as described above with respect to the second lens 164. In other embodiments, the biasing mechanism 172 may include any other suitable biasing mechanism instead of or in addition to a compression spring.

Figure 18:
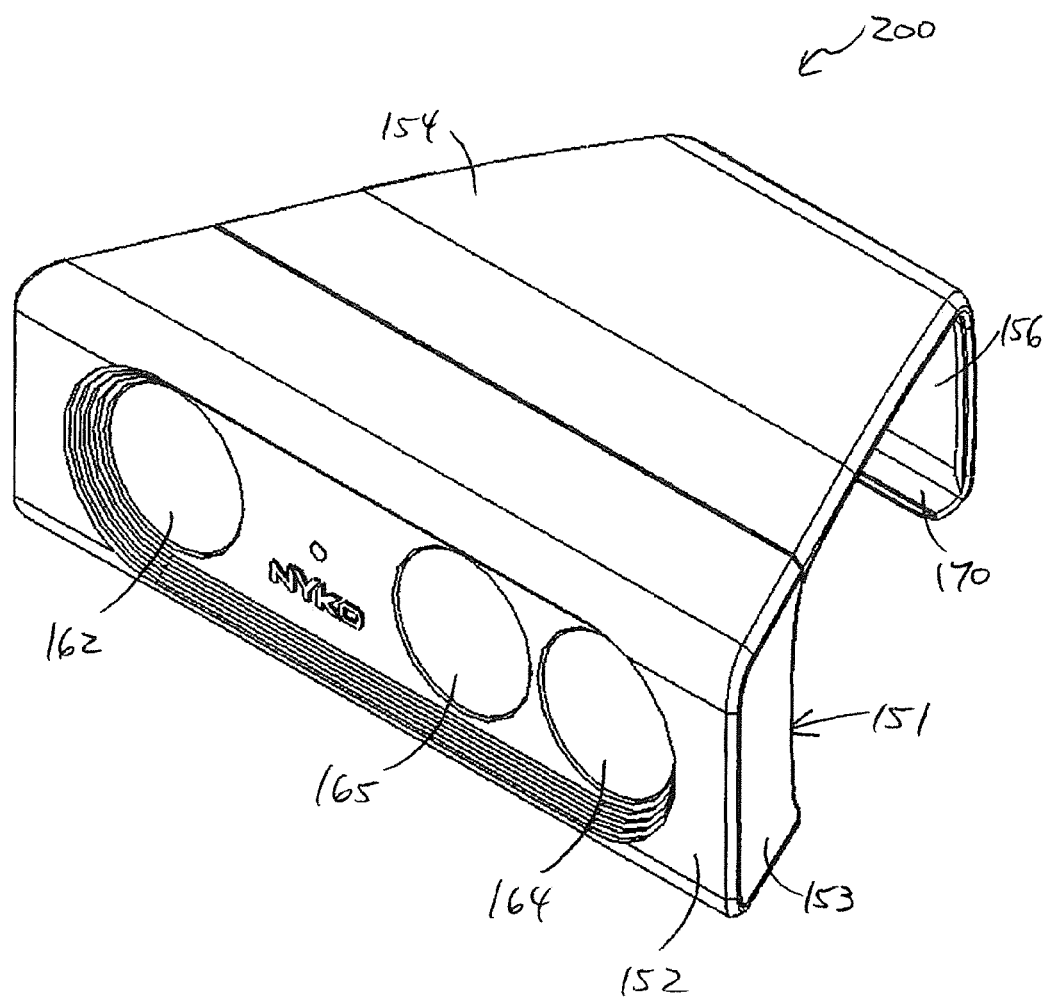
FIG. 18 is a top perspective view of a lens accessory for a video game sensor device according to an embodiment of the present invention.
Figure 19:
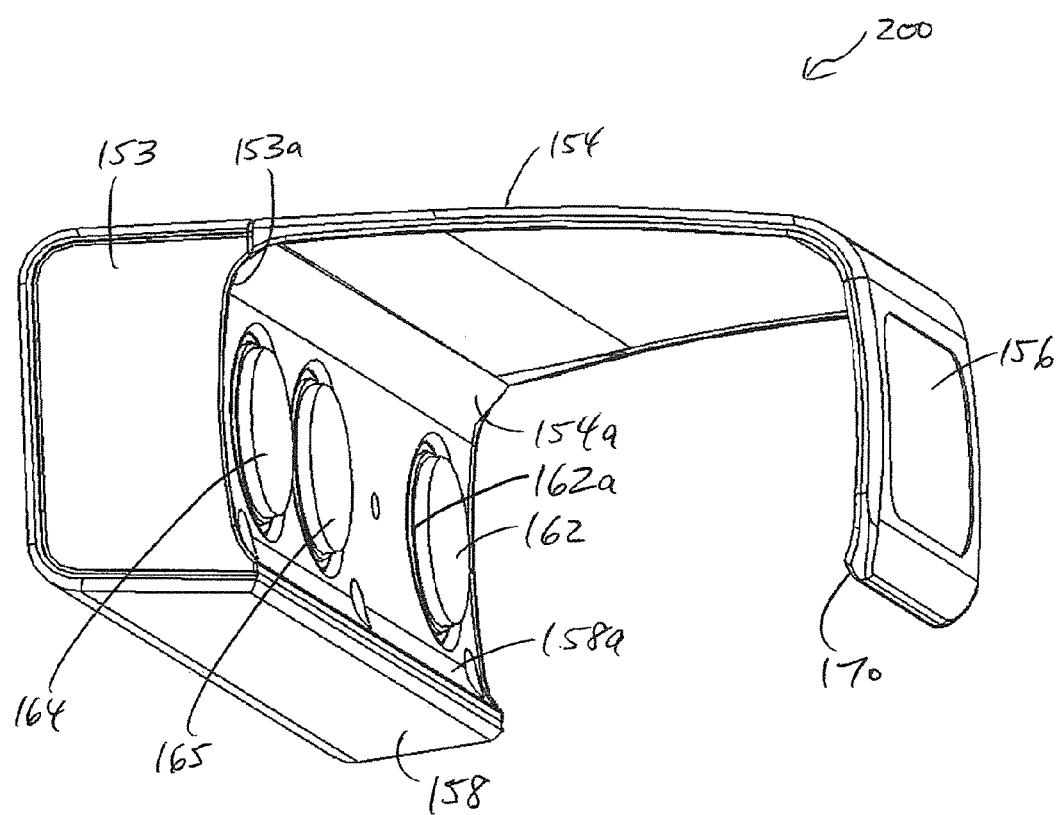
FIG. 19 is a bottom perspective view of the lens accessory of FIG. 18.
Figure 20:
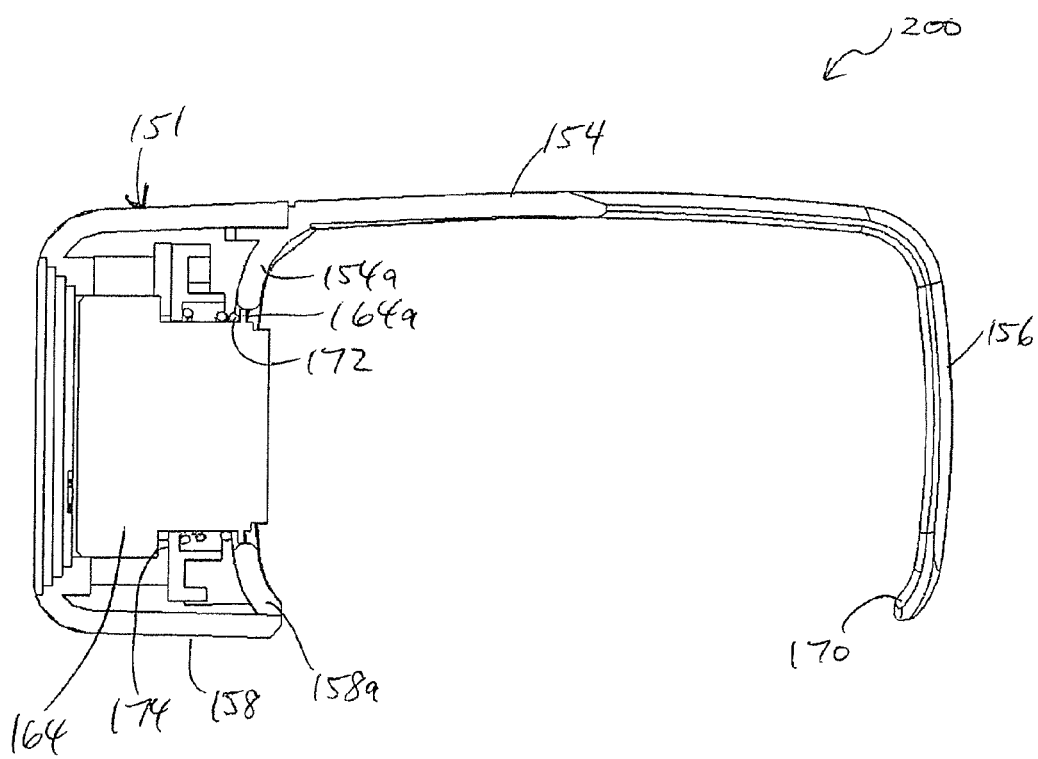
FIG. 20 is a sectional side view of the lens accessory of FIG. 18.

With reference to FIGS. 18-20, a lens accessory 200 according to an exemplary embodiment of the present invention is mountable, attachable, or otherwise useable with a video game sensor device for adjusting a sensing distance of the video game sensor device. The lens accessory 200 may be configured as lens goggles mountable on a video game sensor device, such as the KINECT or any other suitable video game sensor device. Furthermore, the lens accessory 200, in one embodiment, as shown in FIGS. 18-20, has a same or substantially same configuration as that of the lens apparatus 150 described above and shown in FIGS. 12-17 as a component of the video game sensor device 110. However, embodiments of the present invention are not limited thereto, and in other embodiments, the lens accessory 200 may have any other suitable configuration for covering a video game sensor device and adjusting a sensing distance thereof.

In one embodiment, as shown in FIGS. 18-20, the lens accessory 200 has substantially the same configuration as the lens apparatus 150 described above. That is, the lens accessory 200 includes the body portion including the front side 152, the top side 154, the rear side 156, and the bottom side 158, and further includes the first lens 162, the second lens 164, and, in one embodiment, the third lens 165 coupled to the front side 152. The first lens 162, the second lens 164, and the third lens 165 are configured to cover an infrared light emitter, an infrared light receiver, and a camera, respectively, of a video game sensor device for adjusting a sensing distance of the video game sensor device. Also, as described above with respect to the lens apparatus 150, each of the first lens 162, the second lens 164, and the third lens 165 of the lens accessory may have a magnification that is the same, and in one embodiment, for example, the magnification of each of the first lens 162, the second lens 164, and the third lens 165 may be about 0.5× to about 0.7×, such as a magnification of about 0.6×. However, in other embodiments, the magnification may be any other desired amount depending on a degree to which the user desires to adjust a sensing distance of a video game sensor device. In one embodiment, the first lens 162, the second lens 164, and the third lens 165 may have a magnification that is adjustable. Further, in one embodiment, the first lens 162, the second lens 164, and the third lens 165 may be coated with a coating material that is configured to block non-infrared light.

The lens accessory 200 is coupleable (e.g., removably attachable) to a video game sensor device and, in one embodiment, includes the clip portion 170 configured to clip onto the video game sensor device, as described above with respect to the lens apparatus 150. Further, the lens accessory 200, in one embodiment, is elastically deformable for fitting over and clamping around an outer casing of the video game sensor device. That is, the body portion and/or the clip portion 170 may, for example, be made of a thermoplastic material (e.g., SABIC PC/ABS C6200) or another elastically deformable material. However, embodiments of the present invention are not limited to the clip portion 170 described above and shown in the drawings. Rather, in other embodiments, the lens accessory 200 may include any other suitable clip portion or other attachment device or method, or combination thereof, for removably or permanently attaching the lens accessory 200 to a video game sensor device.

While, in one embodiment, the lens accessory 200 has four sides forming a generally rectangular cross-sectional shaped body, the present invention is not limited thereto. That is, in other embodiments, the lens accessory 200 may have any suitable shape or number of sides for coupling with any of various video game sensor devices, which may have configurations different from that of the KINECT, the general shape of which is depicted in FIG. 14 as the casing 120 of the video game sensor device 110. In one embodiment, as shown in FIGS. 18-20, the bottom side 158 is connected to the front side 152, the front side 152 is connected to the top side 154, the top side 154 is connected to the rear side 156, and the rear side 156 is connected to the clip portion 170. The lens accessory 200 may further include a front housing portion 151 housing the first lens 162, the second lens 164, and the third lens 165. In one embodiment, the front housing portion 151 includes the front side 152, the bottom side 158, a portion of the top side 154, and a pair of side walls 153 at opposite sides of the front housing portion 151. The side walls 153 may have a contoured edge 153a having one or more curved portions corresponding to one or more curved portions of the casing 120, such as curved intersecting portions between the front and top sides 122, 124 and the front and bottom sides 122, 128. In one embodiment, the top side 154 includes a downwardly extending concave portion 154a having curvature corresponding to that of a curved intersecting portion between the front and top sides 122, 124 of the casing 120. In one embodiment, the bottom side 158 includes an upwardly extending concave portion 158a having curvature corresponding to that of a curved intersecting portion between the front and bottom sides 122, 128 of the casing 120. Further, in other embodiments, the lens accessory 200 may be configured for at least one of the first lens 162, the second lens 164, and the third lens 165 to cover at least one of an infrared light emitter, an infrared light receiver, and a camera of a video game sensor device by any other device or method, such as by rotation via a hinge, as described above with respect to the lens accessory 100.

Further, in one embodiment, the second lens 164 is at least partially insertable in a cavity of a casing of a video game sensor device adjacent an infrared light receiver of the video game sensor device. Similarly, in one embodiment, the first lens 162 is partially insertable in a cavity of a video game sensor device adjacent an infrared light emitter, and the third lens 165 is partially insertable in a cavity of a video game sensor device adjacent a camera.

In one embodiment, the lens accessory 200 includes the biasing mechanism 172 which, in one embodiment, is a compression spring. The biasing mechanism 172 pushes against the rib 164a of the second lens 164 (see, e.g., FIG. 20) for pushing the second lens 164 toward and into a cavity of a casing of a video game sensor device adjacent an infrared light receiver and for providing a retention force for holding the second lens 164 in the cavity and against a surface in the cavity. Further, the second lens 164, in one embodiment, may include a stepped portion 164b configured to abut a surface 174 of the front housing portion 151 when the second lens 164 is not inserted in and pushed against a surface in the cavity. In one embodiment, the first lens 162 is biased toward a cavity of a video game sensor device adjacent an infrared light emitter, and the third lens 165 is biased toward a cavity of a video game sensor device adjacent a camera via a biasing mechanism in a similar manner as described above with respect to the second lens 164. In other embodiments, the biasing mechanism 172 may include any other suitable biasing mechanism instead of or in addition to a compression spring. Further, in one embodiment, an edge 162a (e.g., an edge proximate the second lens 164) of the first lens 162 (see FIG. 19) that is configured to abut an outer surface of a video game sensor device may be beveled in order to provide the angle α described above with respect to FIG. 9. Similarly, the second lens 164 may have an edge (e.g., an edge proximate the first lens 162) configured to abut the outer surface of a video game sensor device that is beveled in order to provide the angle β described above with respect to FIG. 9.

Figure 21A:
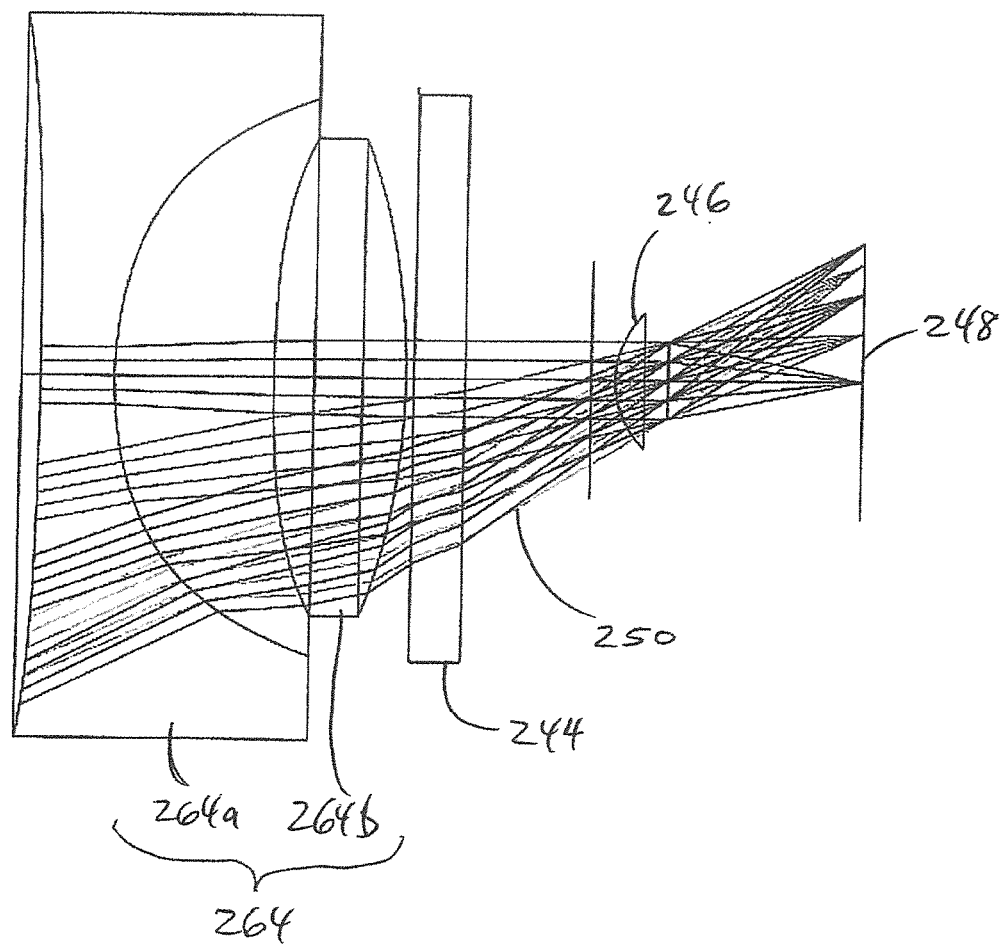
FIG. 21A is a schematic diagram depicting magnification of infrared light rays by a lens apparatus according to an embodiment of the present invention.

FIG. 21A is a schematic diagram depicting the magnification of infrared light rays by a lens apparatus according to an embodiment of the present invention. With reference to FIG. 21A, a lens 264 of a video game sensor device or a lens accessory according to embodiments of the present invention may include a first lens element 264a and a second lens element 264b for directing and magnifying infrared light rays 250 as depicted in the diagram. In one embodiment, for example, the first lens element 264a has concave curvature, and the second lens element 264b has convex curvature. The infrared light rays 250, in one embodiment, pass through the first and second lens elements 264a, 264b before passing through a cover plate 244 and a lens 246 of an infrared light receiver of a video game sensor device and are directed at a sensor 248 of the video game sensor device. A video game sensor device or a lens accessory according to embodiments of the present invention may include a similar two-element lens covering an infrared light emitter and/or a camera of a video game sensor device. That is, one or more of the first lens 62, 162, the second lens 64, 164, and the third lens 65, 165 described above may be configured as a two-element lens similar to the lens 264 shown in FIG. 21A.

Figure 21B:
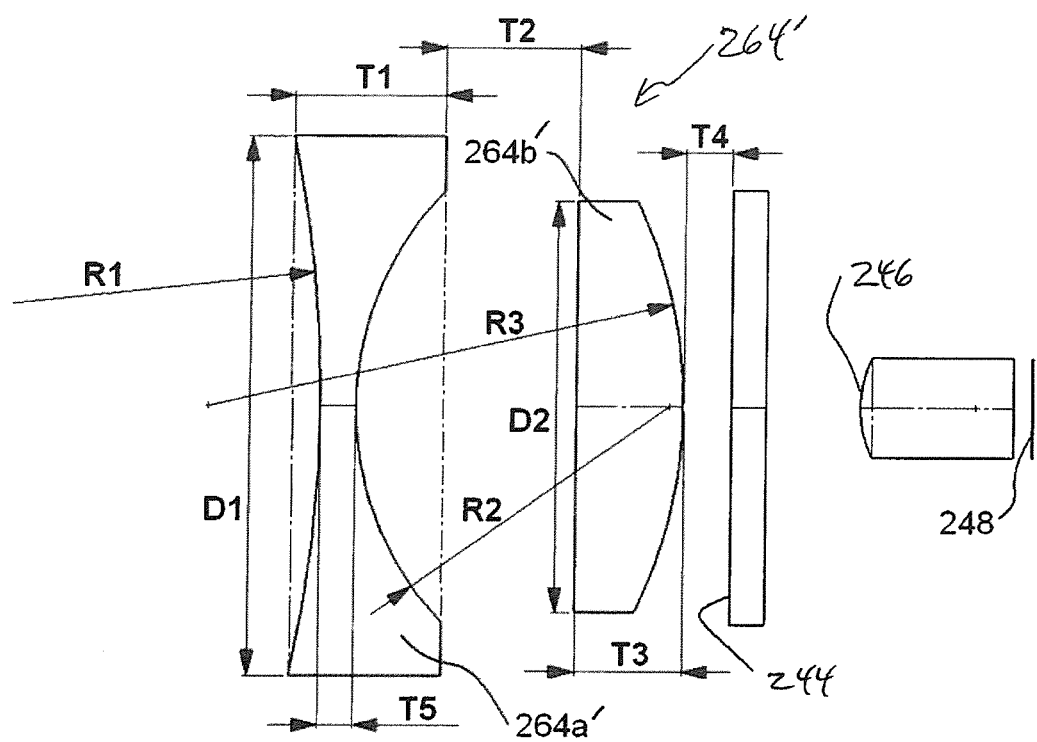
FIG. 21B is a schematic diagram depicting a geometry of a portion of a lens apparatus according to an embodiment of the present invention.

FIG. 21B is a schematic diagram depicting a geometry of a portion of a lens apparatus according to an embodiment of the present invention. With reference to FIG. 21B, a lens 264' of a video game sensor device or a lens accessory according to an embodiment of the present invention may include a first lens element 264a' and a second lens element 264b'. In one embodiment, the first lens element 264a' has a thickness T1, the second lens element 264b' is spaced apart from the first lens element 264a' by a distance T2, the second lens element 264b' has a thickness T3, the second lens element 264b' is configured to be spaced apart from the cover plate 244 of an infrared light receiver of a video game sensor device by a distance T4, and a thickness of the first lens element 264a' between opposite concave surfaces of the first lens element 264a' is T5. Further, in one embodiment, the first lens element 264a' has a diameter D1, and the second lens element 264b' has a diameter D2. Further, in one embodiment, an outward-facing concave surface of the first lens element 264a' has a radius R1, an inward-facing concave surface of the first lens element 264a' has a radius R2, and a convex surface of the second lens element 264b' has a radius R3. In one embodiment, the above-described thicknesses T1, T2, T3, T4, and T5 are about 6.5 mm, 5.6 mm, 4.5 mm, 2 mm, and 1.5 mm, respectively; the above-described diameters D1 and D2 are about 23 mm and 17.5 mm, respectively; and the above-described radii R1, R2, and R3 are about 54 mm, 13.2 mm, and 20.1 mm, respectively. Further, in one embodiment, the first lens element 264a' is made from ZF8 dense flint glass having a refractive index of about 1.65, and the second lens element 264b' is made from ZK10 dense crown glass having a refractive index of about 1.60. In such an embodiment, a resulting magnification is about 0.6×, and a resulting field of view covers an included angle of 112 degrees. Of course, the present invention is not limited thereto and, in other embodiments, the lens elements may have any other suitable geometry, configuration, and/or materials, which may be selected, for example, depending on the desired magnification and field of view. Further, a lens according to other embodiments of the present invention may be made up of a single lens element or more than two lens elements. In one embodiment, the lens 264' may cover an infrared light receiver of a video game sensor device. However, a lens covering an infrared light receiver or a camera of a video game sensor device may have a same or similar configuration.

With reference to FIG. 22, a method 300 of adjusting a sensing distance of a video game sensor device, according to one embodiment of the present invention, is shown. The method 300 is described herein with respect to the video game sensor devices 10, 110 described herein; however, the method 300, or at least some of the tasks thereof, may also be performed using a video game sensor device or a lens accessory for a video game sensor device according to another embodiment, such as the lens accessory 100 or the lens accessory 200 described herein.

In one embodiment, the method 300 includes a task 310 of providing at least one lens. In one embodiment, the at least one lens may include the first lens 62, 162 and the second lens 64, 164 of the video game sensor device 10, 110 or the lens accessory 100, 200 described above. In one embodiment, the at least one lens further includes the third lens 65, 165 described above for covering the camera 45, 145. The method 300, in one embodiment, further includes a task 320 of coating the at least one lens with any suitable coating material for blocking non-infrared light.

The method 300, in one embodiment, includes a task 330 of coupling the at least one lens to a video game sensor device. As described above, the lens apparatus 50, 150, in one embodiment, is removably attachable to the casing 20, 120 of the video game sensor device 10, 110 via a clip portion 70, 170. Similarly, the lens accessories 100, 200 described above may include the clip portion 70, 170 configured to removably attach the lens accessory 100, 200 to a video game sensor device by clipping onto a support post or a casing of the video game sensor device. However, the task 330 of coupling the at least one lens to a video game sensor device is not limited thereto. Rather, the at least one lens may be coupled to a video game sensor device by any other suitable device or method and, moreover, may be removably or permanently coupled by either a user or during a manufacturing process. For example, in one embodiment, the lens apparatus 50, 150 may be attached to, or integrally formed with, the casing 20, 120 of the video game sensor device 10, 110 during a manufacturing process.

In one embodiment, the method 300 further includes a task 340 of rotating the at least one lens. That is, in one embodiment, the first lens 62, 162, the second lens 64, 164, and the third lens 65, 165 may be rotated about an axis of rotation, such as via the hinge 80, relative to the video game sensor device for moving the first lens 62, 162, the second lens 64, 164, and the third lens 65, 165 between a non-adjusting position in which the first lens 62, 162, the second lens 64, 164, and the third lens 65, 165 do not cover the infrared light emitter 42, 142, the infrared light receiver 44, 144, and the camera 45, 145, respectively, and an adjusting position in which the first lens 62, 162, the second lens 64, 164, and the third lens 65, 165 cover the infrared light emitter 42, 142, the infrared light receiver 44, 144, and the camera 45, 145, respectively, for adjusting a sensing distance of the video game sensor device.

The method 300 may further include a task 350 of covering an infrared light emitter and an infrared light receiver with the at least one lens. In one embodiment, the infrared light emitter 42, 142 and the infrared light receiver 44, 144 are covered with the first lens 62, 162 and the second lens 64, 164. In one embodiment, when the first lens 62, 162 and the second lens 64, 164 are rotated or otherwise moved to the adjusting position, the first lens 62, 162 and the second lens 64, 164 will cover the infrared light emitter 42, 142 and the infrared light receiver 44, 144, respectively, for adjusting a sensing distance of the video game sensor device. In other embodiments, the infrared light emitter and an infrared light receiver may be covered with the at least one lens by any other suitable device or method. For example, in one embodiment, the first lens 62 and the second lens 64 may be moved to cover the infrared light emitter 42, 142 and the infrared light receiver 44, 144 by translation (e.g., by a sliding motion), rather than by rotation about an axis. Further, in another embodiment, the infrared light emitter 42, 142 and the infrared light receiver 44, 144 may be moved to a position where they are covered by the first lens 62, 162 and the second lens 64, 164, while the first lens 62, 162 and the second lens 64, 164 are maintained in a stationary location.

The method 300 may further include a task 360 of at least partially inserting the at least one lens into at least one cavity of the video game sensor device. In one embodiment, the second lens 164 is moved from a position outside the cavity 148 adjacent the infrared light receiver 144 (see FIG. 16) to a position in which the second lens 164 is partially inserted in the cavity 148 (see FIGS. 15 and 17). Similarly, in one embodiment, the first lens 162 is partially inserted into the cavity 146 adjacent the infrared light emitter 142, and the third lens 165 is partially inserted in the cavity 149 adjacent the camera 145.

Further, in one embodiment, the method 300 includes a task 365 of biasing the at least one lens toward the at least one cavity of the video game sensor device using a biasing mechanism. In one embodiment, the biasing mechanism 172 is a compression spring. The biasing mechanism 172 pushes against a rib of the at least one lens, such as the rib 164a of the second lens 164 (see, e.g., FIG. 17) and thereby pushes the lens into the cavity of the casing 120 and provides a retention force for holding the lens in the cavity. In one embodiment, the first lens 162 is biased toward the cavity 146 adjacent the infrared light emitter 142, the second lens 164 is biased toward the cavity 148 adjacent the infrared light receiver 144, and the third lens 165 is biased toward the cavity 149 adjacent the camera 145. In other embodiments, the biasing mechanism 172 may include any other suitable biasing mechanism instead of or in addition to a compression spring.

Further, in one embodiment, the method 300 includes a task 370 of covering the camera 45, 145 with the third lens 65, 165. Similarly, in one embodiment, the third lens 65, 165 covers the camera 45, 145 when the third lens 65, 165 is rotated or otherwise moved to the adjusting position, or when the lens apparatus 50, 150 is clipped onto the casing 20, 120 of the video game sensor device 10, 110.

In one embodiment, the method 300 further includes a task 380 of adjusting a magnification of the at least one lens. As described above, the first lens 62, 162, the second lens 64, 164, and the third lens 65, 165 may have an adjustable magnification. Further, the magnification may be adjustable without removing the lens apparatus 50, 150 or the lens accessory 100, 200 from the video game sensor device. As such, the sensing distance of the video game sensor device may be quickly and easily changed so that a user may play the video game while standing at any of various distances from the video game sensor device.

The method 300, in one embodiment, further includes a task 390 of uncovering the infrared light emitter and the infrared light receiver. In one embodiment, the infrared light emitter 42, 142 and the infrared light receiver 44, 144 may be uncovered by moving the first lens 62, 162 and the second lens 64, 164 from the adjusting position to the non-adjusting position. Further, the task 390 may further include uncovering the camera 45, 145 by moving the third lens 65, 165 from the adjusting position to the non-adjusting position.

While in one embodiment, the method 300 of adjusting a sensing distance of a video game sensor device may include each of the tasks described above and shown in FIG. 22, in other embodiments of the present invention, in a method of adjusting a sensing distance of a video game sensor device, one or more of the tasks described above and shown in FIG. 22 may be absent and/or additional tasks may be performed. Further, in the method 300 of adjusting a sensing distance of a video game sensor device according to one embodiment, the tasks may be performed in the order depicted in FIG. 22. However, in a method of adjusting a sensing distance of a video game sensor device according to other embodiments of the present invention, the tasks described above and shown in FIG. 22 may be performed in any other suitable sequence.

Figure 23A:
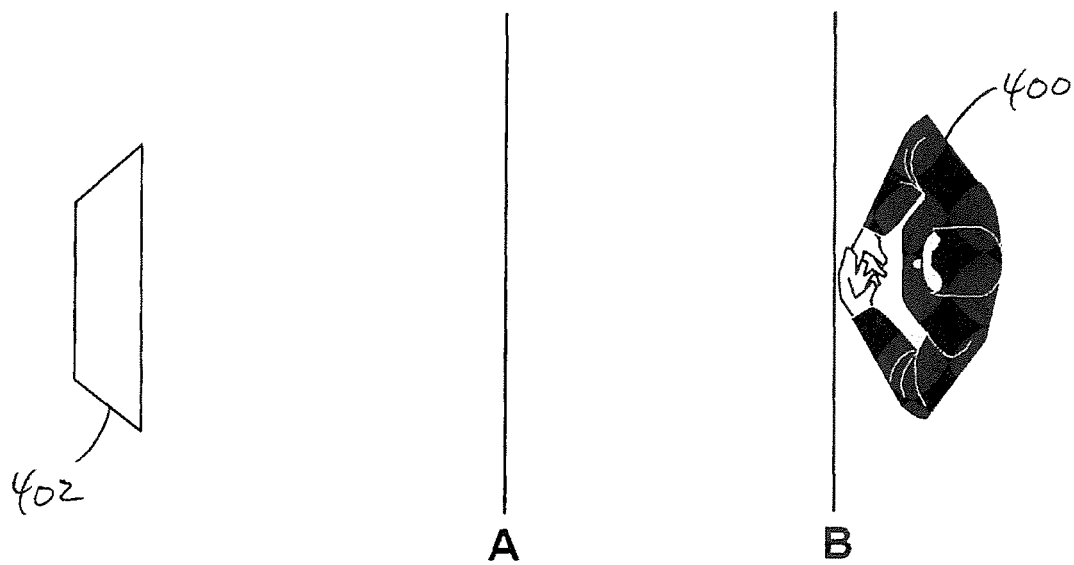
FIG. 23A is a schematic diagram showing a user at a first position relative to a conventional video game sensor device.
Figure 23B:
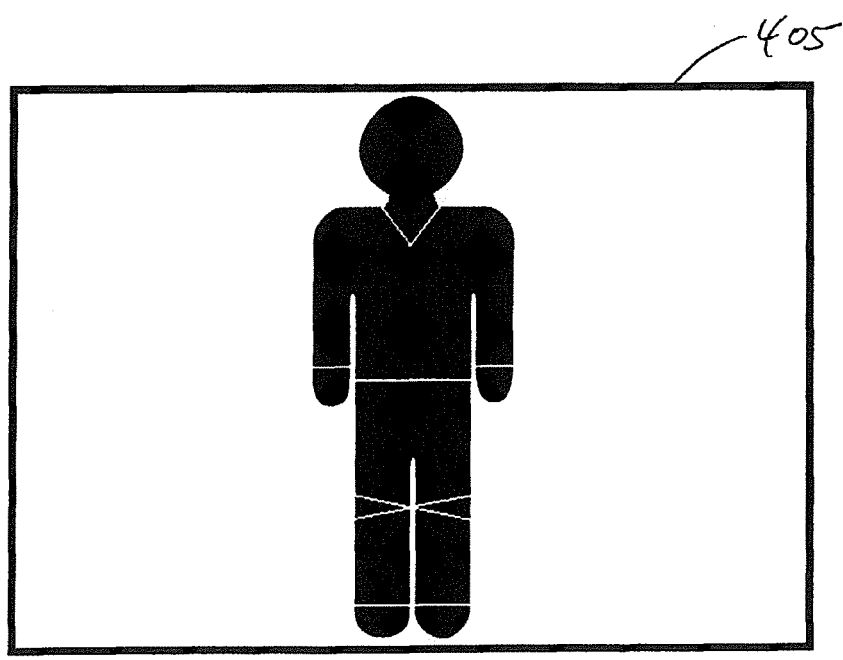
FIG. 23B is a schematic diagram showing an image captured by the conventional video game sensor device of FIG. 23A when the user is at the first position.
Figure 23C:
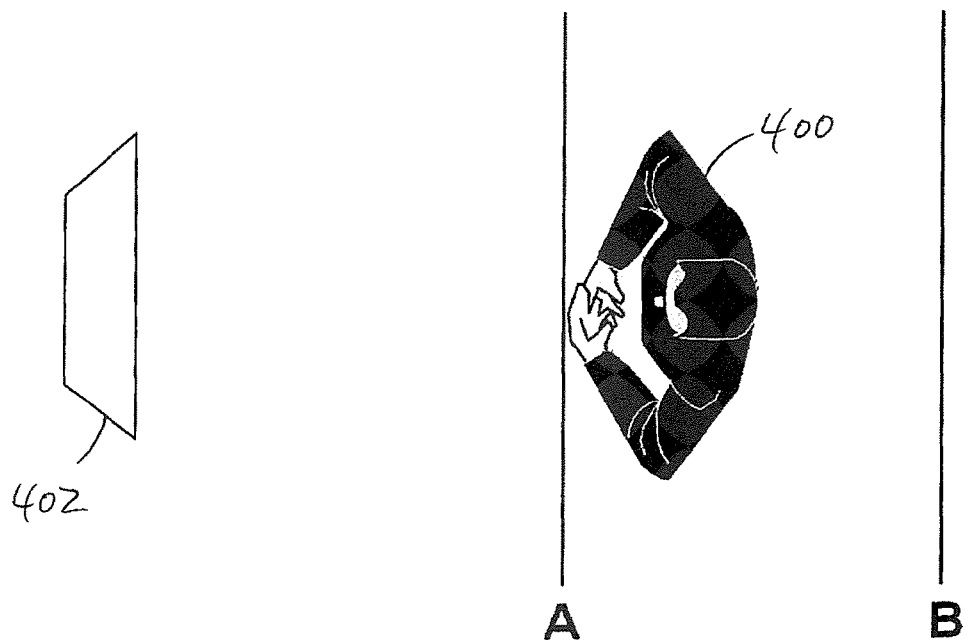
FIG. 23C is a schematic diagram showing a user at a second position relative to the conventional video game sensor device of FIG. 23A.
Figure 23D:
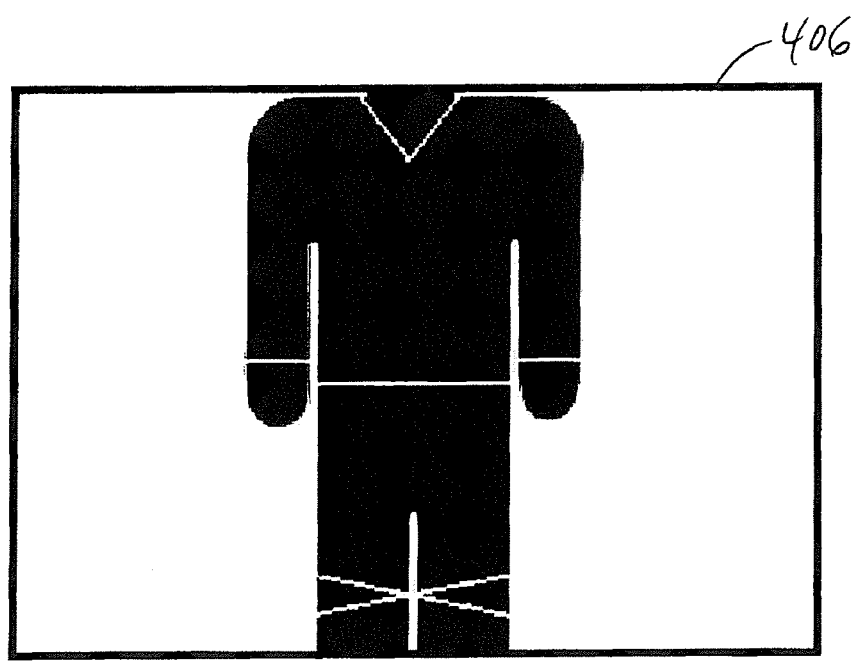
FIG. 23D is a schematic diagram showing an image captured by the conventional video game sensor device of FIG. 23A when the user is at the second position.

An application of embodiments of the present invention that have been described above will now be described with respect to FIGS. 23A through 24D. FIG. 23A is a schematic diagram showing a user 400 at a position B relative to a conventional video game sensor device 402, such as the KINECT, that does not have a lens accessory of the present invention coupled thereto. FIG. 23B is a schematic diagram showing an image 405 captured by the conventional video game sensor device 402 when the user 400 is at the position B. The image 405 includes the entire body of the user 400. FIG. 23C is a schematic diagram showing the user 400 at a position A relative to the conventional video game sensor device 402, in which the position A is at a distance from the conventional video game sensor device 402 less than that of the position B. For example, the position A may be 4 feet from the conventional video game sensor device 402, and the position B may be 7 feet from the conventional video game sensor device 402. Further, the user 400 may be 6 feet tall. FIG. 23D is a schematic diagram showing an image 406 captured by the conventional video game sensor device 402 when the user 400 is at the position A. The image 406 does not include the head and lower legs of the user 400. Therefore, in order to properly use the conventional video game sensor device 402, the user 400 must be at the position B.

Figure 24A:
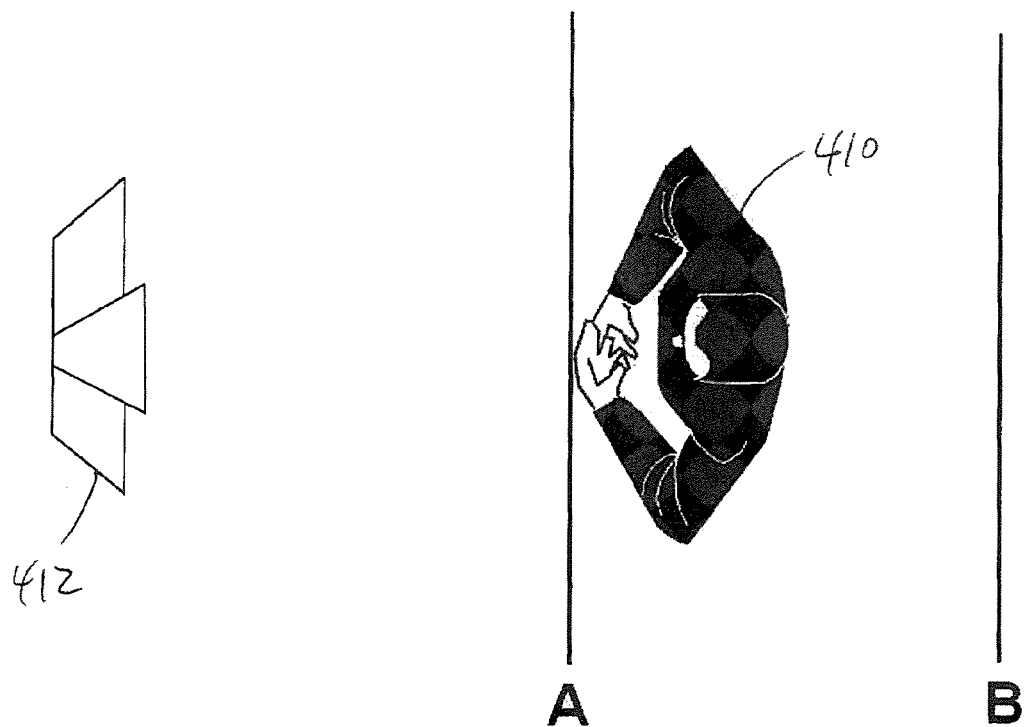
FIG. 24A is a schematic diagram showing a user at a first position relative to a video game sensor device according to an embodiment of the present invention.
Figure 24B:
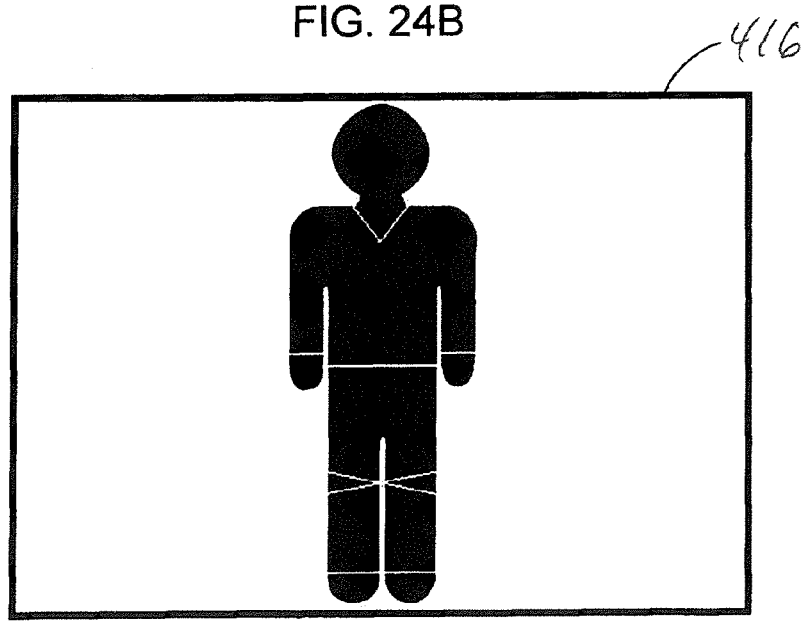
FIG. 24B is a schematic diagram showing an image captured by the video game sensor device of FIG. 24A when the user is at the first position.
Figure 24C:
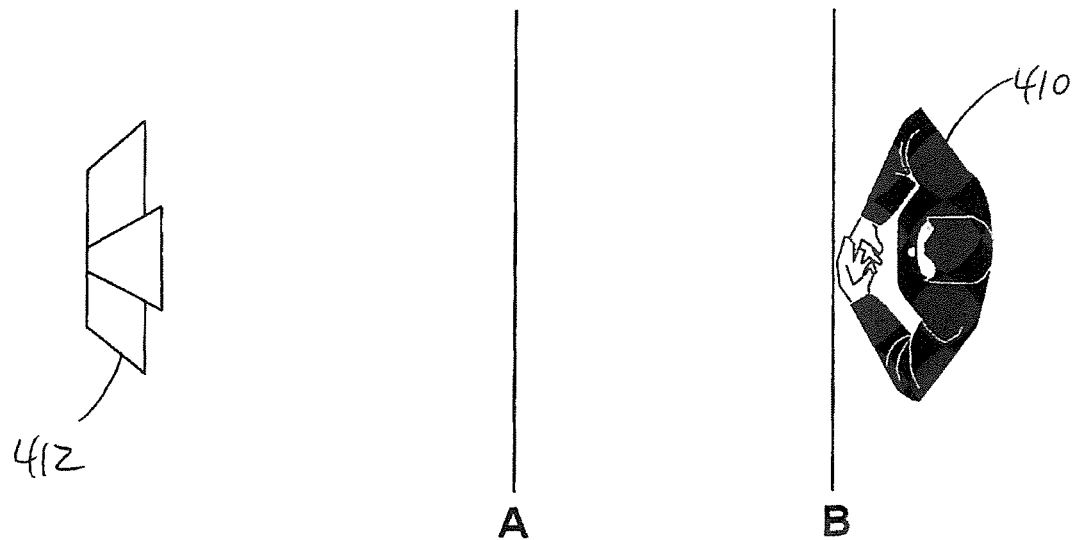
FIG. 24C is a schematic diagram showing a user at a second position relative to the video game sensor device of FIG. 24A.
Figure 24D:
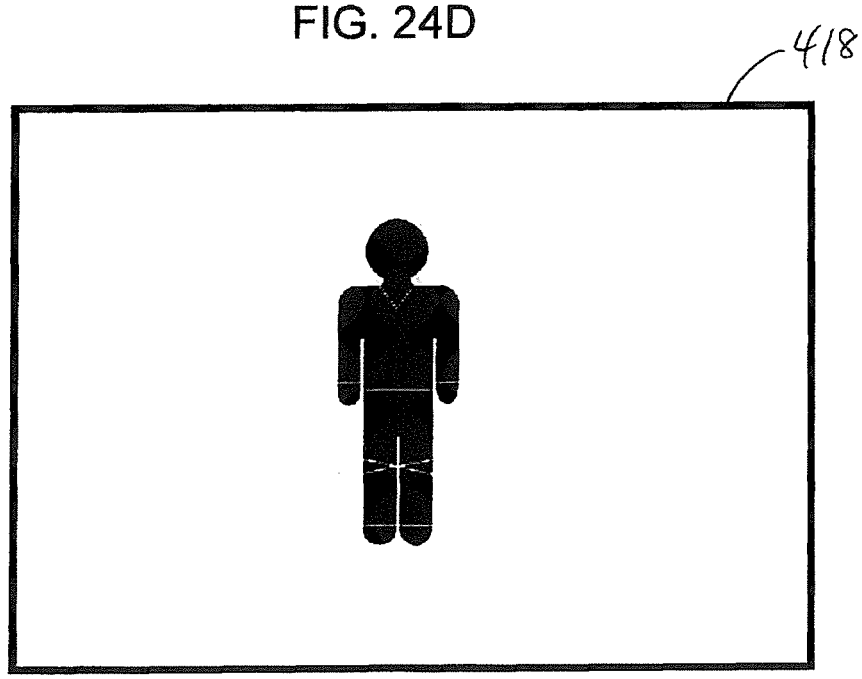
FIG. 24D is a schematic diagram showing an image captured by the video game sensor device of FIG. 24A when the user is at the second position.

FIG. 24A is a schematic diagram showing a user 410 at a position A relative to a video game sensor device 412 or a video game sensor device having a lens accessory according to embodiments of the present invention. The position A corresponds to the position A shown in FIGS. 23C and 23D. FIG. 24B is a schematic diagram showing an image 416 captured by the video game sensor device 412 when the user 410 is at the position A. As depicted in FIG. 24B, the image 416 includes the entire body of the user 410. As such, the user 410 may use the video game sensor device 412 according to embodiments of the present invention at the position A, and the image 416 includes the entire body of the user 410, unlike the image 406 captured by the conventional video game sensor device 402 shown in FIG. 23D. FIG. 24C is a schematic diagram showing the user 410 at a position B relative to the video game sensor device 412, where the position B corresponds to the position B shown in FIGS. 23A and 23B. FIG. 24D is a schematic diagram showing an image 418 captured by the video game sensor device 412 when the user 410 is at the position B. As depicted, the image 418 appears smaller than the image 416 but also includes the entire body of the user 410.

Although the drawings and accompanying description illustrate some exemplary embodiments of a video game sensor device and a lens accessory for a video game sensor device, it will be apparent that the novel aspects of the present invention may also be carried out by utilizing alternative structures, sizes, shapes, and/or materials in embodiments of the present invention. For example, in other embodiments, the hinge 80 may be arranged at a location different from that described above and shown in FIGS. 1-11, or the hinge 80 may be absent altogether, such as in the video game sensor device 110 and the lens accessory 200 according to exemplary embodiments described herein. Also, for example, in other embodiments, a lens accessory may include any other suitable device for attachment to a video game sensor device instead of or in addition to the clip portions 70, 170 described above and shown in the drawings.

The preceding description has been presented with reference to various embodiments of the invention. Persons skilled in the art and technology to which this invention pertains will appreciate that alterations and changes in the described structures and methods of operation can be practiced without meaningfully departing from the principles, spirit, and scope of this invention.

What is claimed is:

1. A lens accessory for a video game sensor device, the lens accessory comprising:
    a first lens having a first magnification;
    a second lens having a second magnification; and
    at least one body portion, the first and second lenses being coupled to the at least one body portion,
    wherein the at least one body portion is coupleable to the video game sensor device such that the first lens covers a lens of an infrared light emitter of the video game sensor device and the second lens covers a lens of an infrared light receiver of the video game sensor device to adjust a sensing distance of the video game sensor device.

2. The lens accessory of claim 1, wherein the at least one body portion is elastically deformable and configured to clip onto the video game sensor device.

3. The lens accessory of claim 1, wherein the first lens and the second lens are at least partially insertable in at least one recess of the video game sensor device at locations corresponding to the infrared light emitter and the infrared light receiver.

4. The lens accessory of claim 3, further comprising at least one biasing member configured to bias the first lens and the second lens toward the at least one recess of the video game sensor device.

5. The lens accessory of claim 1, wherein the first lens and the second lens are arranged at an angle relative to each other such that a center axis of the first lens and a center axis of the second lens cross each other at a convergence point.

6. The lens accessory of claim 1, further comprising a third lens coupled to the at least one body portion and configured to cover a camera of the video game sensor device.

7. The lens accessory of claim 1, wherein the first and second lenses are coated with a coating material configured to block non-infrared light.

8. The lens accessory of claim 1, wherein the first and second magnifications are the same.

9. The lens accessory of claim 1, wherein the first and second magnifications are 0.5× to 0.7×.

10. The lens accessory of claim 1, wherein at least one of the first lens or the second lens comprises a plurality of lens elements.

11. A video game sensor device comprising:
    an infrared light emitter configured to emit infrared light;
    an infrared light receiver configured to receive infrared light;
    a first lens having a first magnification and covering a lens of the infrared light emitter; and
    a second lens having a second magnification and covering a lens of the infrared light receiver,
    wherein the video game sensor device is configured to sense an object at a distance that is adjusted by the first and second lenses.

12. The video game sensor device of claim 11, wherein the first and second magnifications are the same.

13. The video game sensor device of claim 11, wherein the first and second magnifications are 0.5× to 0.7×.

14. The video game sensor device of claim 11, further comprising a camera, and a third lens having a third magnification and covering the camera.

15. The video game sensor device of claim 11, wherein the first and second lenses are movable between respective first positions in which the first lens covers the lens of the infrared light emitter and the second lens covers the lens of the infrared light receiver and respective second positions in which the first lens does not cover the lens of the infrared light emitter and the second lens does not cover the lens of the infrared light receiver.

16. A video game sensor device comprising:
    an infrared light emitter configured to emit infrared light;
    a camera;
    a first lens having a first magnification and covering a lens of the infrared light emitter; and
    a second lens having a second magnification and covering a lens of the camera,
    wherein the video game sensor device is configured to sense an object at a distance that is adjusted by the first and second lenses.

17. The video game sensor device of claim 16, wherein the first and second magnifications are the same.

18. The video game sensor device of claim 16, further comprising a casing housing the infrared light emitter and the camera, and a body portion on the casing and coupling the first and second lenses together.

19. The video game sensor device of claim 18,
    wherein the casing has at least one cavity at a location corresponding to at least one of the infrared light emitter and the camera, and at least one of the first lens or the second lens is at least partially received in the at least one cavity, and wherein the body portion comprises a biasing mechanism biasing the at least one of the first lens or the second lens toward the at least one cavity.

20. The video game sensor device of claim 16, wherein the first and second lenses are movable between respective first positions in which the first lens covers the lens of the infrared light emitter and the second lens covers the lens of the camera and respective second positions in which the first lens does not cover the lens of the infrared light emitter and the second lens does not cover the lens of the camera.

* * * * *